US012586518B2

(12) United States Patent
Jang et al.

(10) Patent No.: US 12,586,518 B2
(45) Date of Patent: Mar. 24, 2026

(54) PIXEL AND DISPLAY DEVICE

(71) Applicant: Samsung Display Co., Ltd., Yongin-si (KR)

(72) Inventors: Jaeyong Jang, Yongin-si (KR); Hyunjoon Kim, Yongin-si (KR); Danwon Lim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/778,239

(22) Filed: Jul. 19, 2024

(65) Prior Publication Data

US 2025/0140169 A1 May 1, 2025

(30) Foreign Application Priority Data

Oct. 26, 2023 (KR) ........................ 10-2023-0144962

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0426* (2013.01);
(Continued)

(58) Field of Classification Search
CPC ... G09G 3/32–3291; G09G 2300/0426; G09G 2300/043; G09G 2300/0439;
(Continued)

(56) References Cited

U.S. PATENT DOCUMENTS 9,135,862 B2 9/2015 Park et al.
11,790,841 B2 10/2023 Yu et al.
(Continued)

FOREIGN PATENT DOCUMENTS

CN 112927651 6/2021
KR 10-2011-0139005 12/2011
(Continued)

OTHER PUBLICATIONS

International Search Report corresponding to International Application No. PCT/KR2024/014409 dated Dec. 20, 2024.

*Primary Examiner* — Nathan Danielsen
(74) *Attorney, Agent, or Firm* — Innovation Counsel LLP

(57) ABSTRACT

A pixel includes a light emitting element connected between a first power line and a first node, a first transistor including a first electrode electrically connected to the first node, a second electrode electrically connected to a second node, and a gate electrode electrically connected to a third node, a second transistor including a first electrode electrically connected to a data line, a second electrode electrically connected to a fourth node, and a gate electrode to receive a scan signal, a third transistor including a first electrode connected to the first node, a second electrode connected to the third node, and a gate electrode to receive a compensation signal, a fourth transistor including a first electrode electrically connected to the third node, a second electrode electrically connected to the fourth node, and a gate electrode to receive a first light emitting signal, and a first capacitor.

24 Claims, 14 Drawing Sheets

(52) U.S. Cl.
CPC ... *G09G 2300/043* (2013.01); *G09G 2310/08* (2013.01); *G09G 2320/0233* (2013.01)

(58) Field of Classification Search
CPC ... G09G 2300/0809; G09G 2300/0819; G09G 2300/0842–0852; G09G 2310/06; G09G 2310/08; G09G 2320/0209; G09G 2320/0214; G09G 2320/0233; G09G 2320/0242; G09G 2320/043; G09G 2320/045
See application file for complete search history.

(56) References Cited

U.S. PATENT DOCUMENTS

| | | | | |
|---|---|---|---|---|
| 2013/0249883 | A1* | 9/2013 | Hwang | G09G 3/3275 345/212 |
| 2013/0265215 | A1* | 10/2013 | Liao | G09G 3/3233 345/82 |
| 2020/0105193 | A1* | 4/2020 | Qing | G09G 3/3266 |
| 2022/0310746 | A1* | 9/2022 | Huang | H10K 59/131 |

FOREIGN PATENT DOCUMENTS

| | | |
|---|---|---|
| KR | 10-2012-0003154 | 1/2012 |
| KR | 10-1202039 | 11/2012 |
| KR | 10-2016391 | 8/2019 |
| KR | 10-2023-0033789 | 3/2023 |
| KR | 10-2023-0096204 | 6/2023 |

* cited by examiner

PIXEL AND DISPLAY DEVICE

CROSS-REFERENCE TO RELATED APPLICATION(S)

This application claims priority to and benefits of Korean Patent Application No. 10-2023-0144962 under 35 U.S.C. § 119, filed on Oct. 26, 2023, in the Korean Intellectual Property Office, the entire contents of which are incorporated herein by reference.

BACKGROUND

Embodiments relate to a pixel and a display device having improved display quality.

A display device is a device including various electronic components, such as a display panel, an input sensor, which senses an external input, and an electronic module. The electronic components are electrically connected to each other through signal lines, which are variously arranged. The display panel includes pixels. Each pixel includes a light emitting element, which generates light, and a pixel driving circuit, which controls an amount of current flowing through the light emitting element. In case that a leakage current is caused in the pixel driving circuit in the pixel, a change in an amount of current flowing through the light emitting elements results in degradation of the display quality.

SUMMARY

Embodiments provide a pixel and a display device having improved display quality.

However, embodiments are not limited to those set forth herein. The above and other embodiments will become more apparent to one of ordinary skill in the art to which the disclosure pertains by referencing the detailed description of the disclosure given below.

According to an embodiment, a pixel may include light emitting element connected between a first node and a first power line to provide a first supply voltage, a first transistor including a first electrode electrically connected to the first node, a second electrode electrically connected to a second node, and a gate electrode electrically connected to a third node, a second transistor including a first electrode electrically connected to a data line to provide a data signal, a second electrode electrically connected to a fourth node, and a gate electrode to receive a scan signal, a third transistor including a first electrode connected to the first node, a second electrode connected to the third node, and a gate electrode to receive a compensation signal, a fourth transistor including a first electrode electrically connected to the third node, a second electrode electrically connected to the fourth node, and a gate electrode to receive a first light emitting signal, and a first capacitor connected between the second node and the fourth node.

The pixel may further include a fifth transistor including a first electrode connected to the second node, a second electrode electrically connected to a second power line to provide a second supply voltage having a voltage level lower than a voltage level of the first supply voltage, and a gate electrode to receive the first light emitting signal.

The pixel may further include a sixth transistor including a first electrode electrically connected to the first node, a second electrode electrically connected to an initialization voltage line to provide an initialization voltage, and a gate electrode to receive a compensation scan signal.

The pixel may further include a (6-1)-th transistor including a first electrode electrically connected to the first node, a second electrode electrically connected to the first power line, and a gate electrode to receive a compensation scan signal.

The pixel may further include a seventh transistor including a first electrode connected to the first node, a second electrode connected to the first electrode of the first transistor, and a gate electrode to receive a second light emitting signal.

The pixel may further include a second capacitor connected between the fourth node and the second power line.

The compensation scan signal and the first light emitting signal may have an active level during a first period.

The first supply voltage may be provided to the third node during the first period.

The compensation scan signal and the second light emitting signal may have an active level during a second period subsequent to the first period.

A voltage value, which is obtained by subtracting a threshold voltage of the first transistor from the first supply voltage, may be provided to the second node during the second period.

The scan signal may have the active level during a third period subsequent to the second period.

The data signal may be provided to the fourth node during the third period.

The first light emitting signal and the second light emitting signal may have the active level during a fourth period subsequent to the third period.

According to an embodiment, a display device may include a display panel including a plurality of pixels, each of the plurality of pixels may include a light emitting element connected between a first node and a first power line to provide a first supply voltage, a first transistor including a first electrode electrically connected to the first node, a second electrode electrically connected to a second node, and a gate electrode electrically connected to a third node, and a second transistor including a first electrode electrically connected to a data line to provide a data signal, a second electrode electrically connected to a fourth node, and a gate electrode to receive a scan signal, a third transistor including a first electrode connected to the first node, a second electrode connected to the third node, and a gate electrode to receive a compensation scan signal, a fourth transistor including a first electrode connected to the third node, a second electrode connected to the fourth node, and a gate electrode to receive a first light emitting signal, and a first capacitor connected between the second node and the fourth node.

Each of the plurality of pixels may further include a fifth transistor including a first electrode connected to the second node, a second electrode electrically connected to a second power line to provide a second supply voltage having a voltage level lower than a voltage level of the first supply voltage, and a gate electrode to receive the first light emitting signal.

Each of the plurality of pixels may include a sixth transistor including a first electrode electrically connected to the first node, a second electrode electrically connected to an initialization voltage line to provide an initialization voltage, and a gate electrode to receive the compensation scan signal.

Each of the plurality of pixels may include a (6-1)-th transistor including a first electrode electrically connected to the first node, a second electrode electrically connected to the first power line and a gate electrode to receive the compensation scan signal.

Each of the plurality of pixels may further include a seventh transistor including a first electrode connected to the first node, a second electrode connected to the first electrode of the first transistor, and a gate electrode to receive a second light emitting signal.

Each of the plurality of pixels may further include a second capacitor connected between the fourth node and the second power line.

The compensation scan signal and the first light emitting signal may have an active level during a first period.

The compensation scan signal and the second light emitting signal may have the active level during a second period subsequent to the first period.

The scan signal may be in the active level during a third period subsequent to the second period.

The first light emitting signal and the second light emitting signal may have the active level during a fourth period subsequent to the third period.

According to an embodiment, a pixel may include a light emitting element connected between a first node and a first power line to provide a first supply voltage, a first transistor connected between the first node and a second node and including a gate electrode electrically connected to a third node, a second transistor connected between a fourth node and a data line to provide a data signal and including a gate electrode to receive a scan signal, a third transistor connected between the first node and the third node and including a gate electrode to receive a compensation scan signal, a fourth transistor connected between the third node and the fourth node and including a gate electrode to receive a first light emitting signal, a fifth transistor connected between the second node and a second power line to provide a second supply voltage having a voltage level lower than a voltage level of the first supply voltage and including a gate electrode to receive the first light emitting signal, and a sixth transistor connected between the first node and an initialization voltage line to provide an initialization voltage and including a gate electrode to receive the compensation scan signal.

The pixel may further include a first capacitor connected between the second node and the fourth node.

The pixel may further include a seventh transistor connected between the first node and the first transistor, and including a gate electrode to receive a second light emitting signal. The pixel may further include a second capacitor connected between the fourth node and the second power line.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
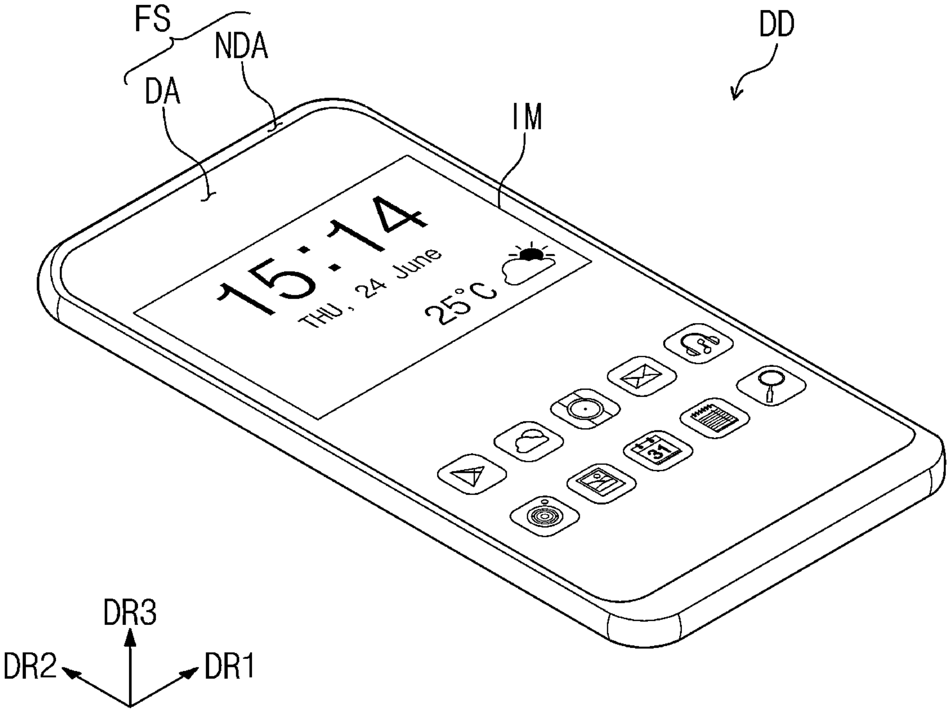
FIG. 1 is a schematic perspective view of a display device according to an embodiment.

In the following description, for the purposes of explanation, numerous specific details are set forth in order to provide a thorough understanding of various embodiments or implementations of the invention. As used herein, "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the axis of the first direction DR1, the axis of the second direction DR2, and the axis of the third direction DR3 are not limited to three axes of a rectangular coordinate system, such as the X, Y, and Z-axes, and may be interpreted in a broader sense. For example, the axis of the first direction DR1, the axis of the second direction DR2, and the axis of the third direction DR3 may be perpendicular to one another, or may represent different directions that are not perpendicular to one another. For the purposes of this disclosure, "at least one of A and B" may be understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Hereinafter, embodiments will be described with reference to accompanying drawings.

FIG. 1 is a schematic perspective view of a display device according to an embodiment.

Referring to FIG. 1, according to an embodiment, a display device DD may have a shape having a shorter side extending in a first direction DR1 and a longer side extending in a second direction DR2 intersecting the first direction DR1. However, the shape of the display device DD is not limited thereto, but various display devices DD having various shapes may be provided.

According to an embodiment, the display device DD may include a large-size display device, such as a television or a monitor, or a small or medium-size display device, such as a cellular phone, a tablet, a vehicle navigation, or a game console. The above examples are provided only for the illustrative purpose, and it is obvious that the display device DD may be applied to any other electronic device(s) without departing from the scope of the disclosure.

As illustrated in FIG. 1, the display device DD may display an image IM, in a third direction DR3 intersecting the first direction DR1 and the second direction DR2, on a display surface FS parallel to the first direction DR1 and the second direction DR2, respectively. The display surface FS on which the image IM may be displayed may correspond to a front surface of the display device DD.

The display surface FS of the display device DD may be divided into a plurality of regions. The display surface FS of the display device DD may be divided into a display region DA and a non-display region NDA.

The display region DA may be a region in which the image IM is displayed. The user may view the image IM through the display region DA. The shape of the display region DA may be defined by the non-display region NDA. However, the above structure is provided for the illustrative purpose. For example, the non-display region NDA may be disposed to be adjacent to only one side of the display region DA or may be omitted. The display device DD according to an embodiment may include various embodiments, and embodiments are not limited thereto.

The non-display region NDA, which is a region adjacent to the display region DA, may be a region in which the image IM is not displayed. A bezel region of the display device DD may be defined by the non-display region NDA.

The non-display region NDA may surround the display region DA. However, the structure is provided for the illustrative purpose. For example, the non-display region NDA may be adjacent to only a portion of an edge portion of the display region DA, and not limited to any one embodiment.

Figure 2:
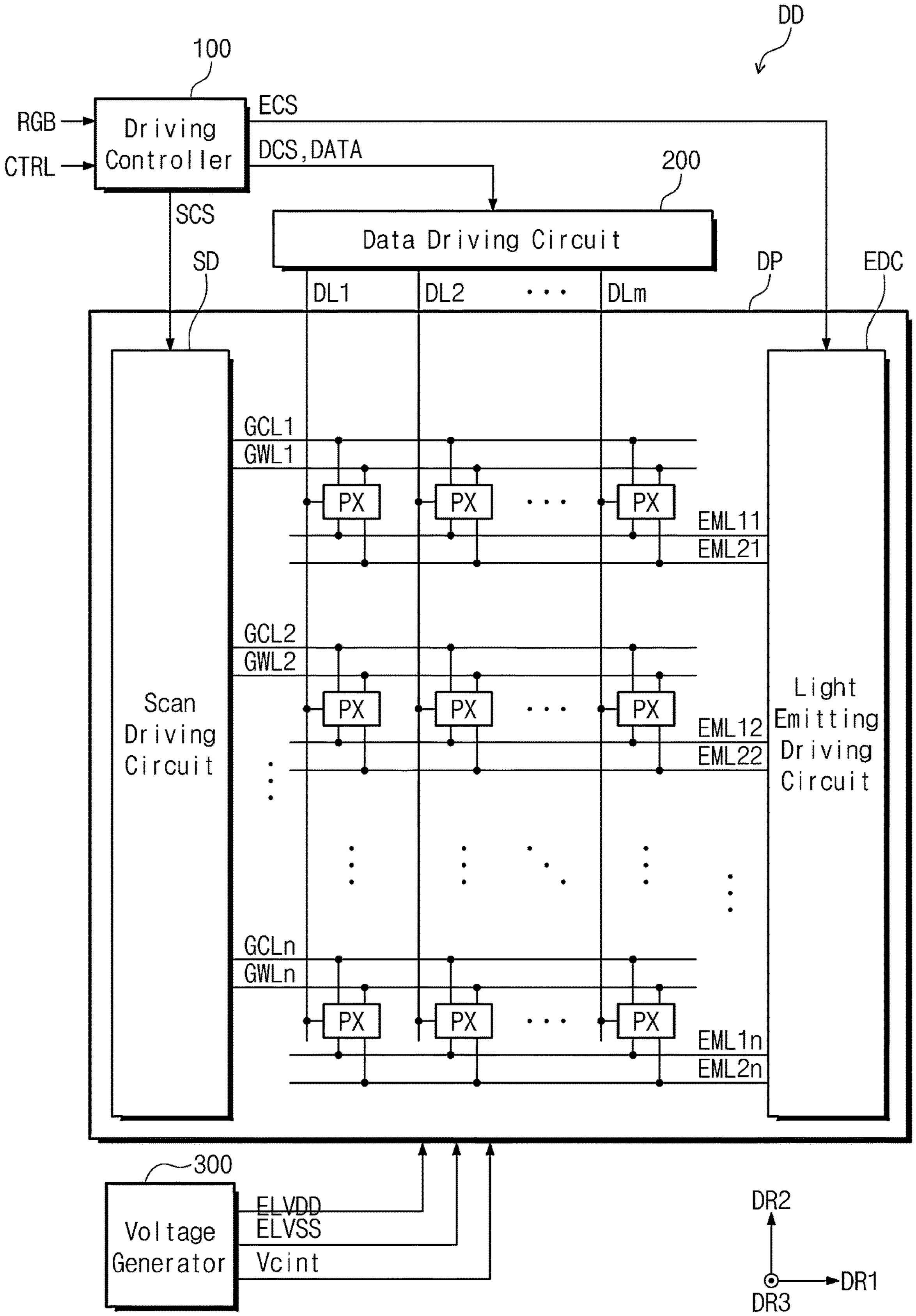
FIG. 2 is a block diagram of a display device according to an embodiment.

FIG. 2 is a block diagram of a display device according to an embodiment.

Referring to FIG. 2, the display device DD may include a display panel DP, a driving controller 100, a data driving circuit 200, and a voltage generator 300.

According to an embodiment, the display panel DP may be an emissive-type display panel, and embodiments are not limited thereto. For example, the display panel DP may be an organic light emitting display panel, a quantum dot light emitting display panel, a micro-light emitting diode (LED) display panel, or a nano-LED display panel. The light emitting layer of the organic light emitting display panel may include an organic light emitting material. The light emitting layer of the quantum dot light emitting display panel may include a quantum dot, or a quantum rod, or the like. A light emitting layer of the micro-LED display panel may include a micro-LED. A light emitting layer of the nano-LED display layer may include a nano-LED.

The driving controller 100 may receive an input image signal RGB and a control signal CTRL. The driving controller 100 may generate an image data signal DATA by transforming a data format of the input image signal RGB to be matched (or compatible) to the interface specification of the data driving circuit 200. The driving controller 100 may output a scan control signal SCS, a data control signal DCS, and a light emitting control signal ECS.

The data driving circuit 200 may receive the data control signal DCS and the image data signal DATA from the driving controller 100. The data driving circuit 200 may transform the image data signal DATA into data signals Vdata (see FIG. 3), and the data signals Vdata (see FIG. 3) may be output to data lines DL1 to DLm, respectively. The data signals Vdata (see FIG. 3) may be analog voltages corresponding to grayscale values of the image data signal DATA.

According to an embodiment, the data driving circuit 200 may output the data signals (see FIG. 3) corresponding to the image data signal DATA to the data lines DL1 to DLm, respectively during the duration of one frame.

The voltage generator 300 may generate voltages necessary for an operation of the display panel DP. According to an embodiment, the voltage generator 300 may generate a first supply voltage ELVDD, a second supply voltage ELVSS, and an initialization voltage Vcint. The first supply voltage ELVDD may have a voltage level higher than that of the second supply voltage ELVSS.

The display panel DP may include scan lines GCL1 to GCLn, and GWL1 to GWLn, light emitting control lines EML11 to EML1*n* and EML21 to EML2*n*, data lines DL1 to DLm, and pixels PX. The display panel DP may further include a scan driving circuit SD and a light emitting driving circuit EDC.

The scan driving circuit SD may be arranged in/at a first side of the display panel DP. The scan lines GCL1 to GCLn, and GWL1 to GWLn may extend in the first direction DR1 from the scan driving circuit SD.

The light emitting driving circuit EDC may be disposed in/at a second side of the display panel DP. The light emitting control lines EML11 to EML1*n*, and EML21 to EML2*n* may extend in a direction opposite to the first direction DR1 from the light emitting driving circuit EDC.

The scan lines GCL1 to GCLn, and GWL1 to GWLn and the light emitting control lines EML11 to EML1*n*, and EML21 to EML2*n* may be arranged to be spaced from each other in the second direction DR2.

The scan lines GCL1 to GCLn, and GWL1 to GWLn may include the compensation scan lines GCL1 to GCLn and the write scan lines GWL1 to GWLn.

The light emitting control lines EML11 to EML1*n*, and EML21 to EML2*n* may include the first light emitting control lines EML11 to EML1*n* and the second light emitting control lines EML21 to EML2*n*.

The data lines DL1 to DLm may extend in a direction opposite to the second direction DR2 from the data driving circuit 200. The data lines DL1 to DLm may be arranged to be spaced apart from each other in the first direction DR1.

According to the embodiment illustrated in FIG. 2, the scan driving circuit SD and the light emitting driving circuit EDC may be arranged to face each other in case that the pixels PX are interposed between the scan driving circuit SD and the light emitting driving circuit EDC. However, embodiments are not limited thereto. For example, the scan driving circuit SD and the light emitting driving circuit EDC may be positioned adjacent to each other on one of the first side and the second side of the display panel DP. According to an embodiment, the scan driving circuit SD and the light emitting driving circuit EDC may be integrally implemented into a single circuit.

The plurality of pixels PX may be electrically connected to the scan lines GCL1 to GCLn, and GWL1 to GWLn, the light emitting control lines EML11 to EML1*n*, and EML21 to EML2*n*, and the data lines DL1 to DLm. According to an embodiment, each of the plurality of pixels PX may be electrically connected to two scan lines and two light emitting control lines.

Figure 3:
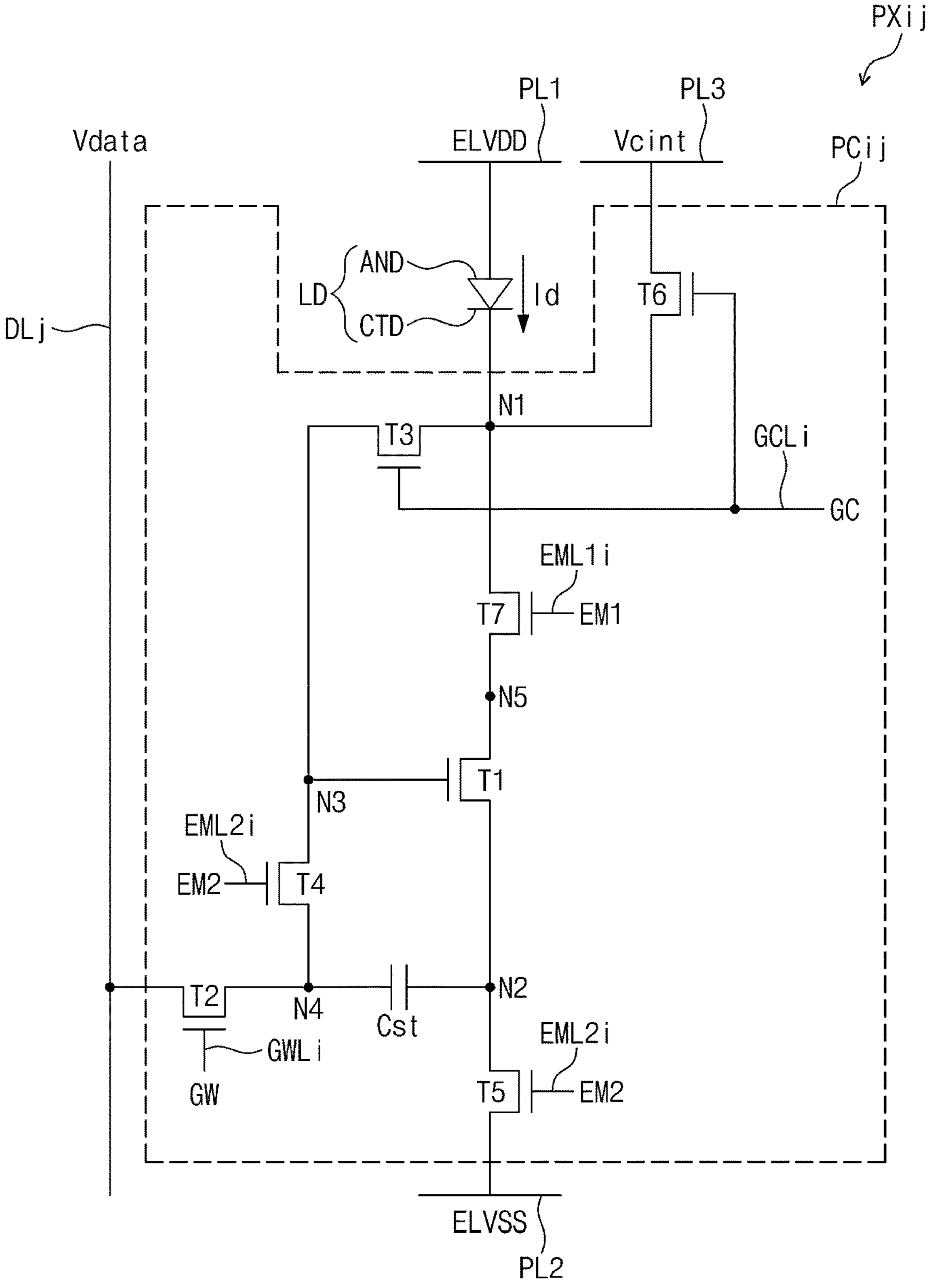
FIG. 3 is a schematic diagram of an equivalent circuit of a pixel according to an embodiment.

Each of the pixels PX may include a light emitting element LD (see FIG. 3) and a pixel circuit unit to control a light emitting operation of the light emitting element LD (see FIG. 3). The details thereof will be described.

The light emitting element LD (see FIG. 3) of each of the pixels PX may generate light having mutually different colors. For example, the pixels PX may include red pixels to generate red color light, green pixels to produce green color light, and blue pixels to generate blue color light. A light emitting element of a red pixel, a light emitting element of a green pixel, and a light emitting element of a blue pixel may include light emitting layers including mutually different materials.

The pixel circuit unit may include at least one transistor and at least one capacitor. The details thereof will be described later. The scan driving circuit SD and the light emitting driving circuit EDC may include transistors formed by the same process as processes for transistors included in the pixel circuit unit.

Each of the plurality of pixels PX may receive the first supply voltage ELVDD, the second supply voltage ELVSS, and the initialization voltage Vcint, from the voltage generator 300.

The scan driving circuit SD may receive the scan control signal SCS from the driving controller 100. The scan driving circuit SD may output scan signals to the scan lines GCL1 to GCLn, and GWL1 to GWLn, in response to the scan control signal SCS.

The light emitting driving circuit EDC may output the light emitting signals to the light emitting control lines EML11 to EML1*n*, and EML21 to EML2*n*, in response to a light emitting control signal ECS from the driving controller 100.

According to an embodiment, the driving controller 100 may determine a driving frequency, and may control the data driving circuit 200, the scan driving circuit SD, and the light emitting driving circuit EDC, according to the determined driving frequency.

FIG. 3 is a circuit diagram of a pixel according to an embodiment. Each of pixels PX illustrated in FIG. 2 may have the same circuit configuration as the equivalent circuit of a pixel PXij illustrated in FIG. 3.

Referring to FIG. 3, the pixel PXij may be connected to a j-th data line DLj among data lines DL1 to DLm, an i-th compensation scan line GCLi among compensation scan lines GCL1 to GCLn, an i-th write scan line GWLi among write scan lines GWL1 to GWLnL, an i-th first light emitting control line EML1*i* among first light emitting control line EML11 to EML1*n*, and an i-th second light emitting control line EML2*i* among second light emitting control line EML21 to EML2*n*. Here, "i" and "j" may be natural numbers.

The pixel PXij may include the light emitting element LD and a pixel driving circuit PCij. The light emitting element LD may be a light emitting diode, and for example, an organic light emitting diode including an organic light emitting layer. The pixel driving circuit PCij may be connected to the light emitting element LD to control an amount of current flowing through the light emitting element LD, and the light emitting element LD may generate light having specific brightness according to an amount of current provided.

The pixel driving circuit PCij may include first to seventh transistors T1, T2, T3, T4, T5, T6, and T7, and a first capacitor Cst.

According to an embodiment, the pixel PXij may be referred to as having a 7T-1C structure.

According to an embodiment, all the first to seventh transistors T1, T2, T3, T4, T5, T6, and T7 may be N-type transistors having a semiconductor layer including an oxide semiconductor. However, this is provided only for the illustrative purpose. The semiconductor layer according to an embodiment may include a low-temperature polycrystalline silicon or crystalline silicon, without limitation. The first to seventh transistors T1, T2, T3, T4, T5, T6, and T7 may be implemented in an N type such that the change in a device characteristic or an instantaneous afterimage may be reduced or minimized. However, this is provided only for the illustrative purpose, and all the first transistor T1 to the seventh transistor T7 may be P-type transistors. According to an embodiment, at least one of the first to seventh transistors T1, T2, T3, T4, T5, T6, and T7 may be an N-type transistor, and a remaining transistor of the first to seventh transistors T1, T2, T3, T4, T5, T6, and T7 may be a P-type transistor.

The scan lines GCLi and GWLi may transmit scan signals GC and GW, respectively, and the light emitting control lines EML1*i* and EML2*i* may transmit light emitting signals EM1 and EM2. The j-th data line DLj may transmit a data signal Vdata. The data signal Vdata may have a voltage level corresponding to a grayscale value of the image data signal DATA input into the display device DD (see FIG. 2).

A first power line PL1 may provide the first supply voltage ELVDD. A second power line PL2 may provide the second supply voltage ELVSS. The second supply voltage ELVSS may have a voltage level lower than that of the first supply voltage ELVDD. An initialization voltage line PL3 may provide the initialization voltage Vcint.

The light emitting element LD may be connected between the first power line PL1, to which the first supply voltage ELVDD is provided, and a first node N1. The light emitting element LD may include an anode AND and a cathode CTD. The anode AND may be connected to the first power line PL1. The cathode CTD may be connected (e.g., electrically connected) to the second power line PL2 through the seventh transistor T7, the first transistor T1, and the fifth transistor T5.

In case that the light emitting element LD is an organic light emitting element, the light emitting element LD may further include an organic layer interposed between the anode AND and the cathode CTD. The cathode CTD of the light emitting element LD may be connected to the pixel driving circuit PCij through the first node N1. The light emitting element LD may emit light to correspond to an amount of current of a driving current Id flowing through the first transistor T1 of the pixel driving circuit PCij.

The first transistor T1 may include a first electrode connected (e.g., electrically connected) to the first node N1 through the seventh transistor T7, a second electrode connected (e.g., electrically connected) to a second node N2, and a gate electrode connected (e.g., electrically connected) to a third node N3. The first transistor T1 may be referred to as a driving transistor. The first electrode of the first transistor T1 may be connected (e.g., electrically connected) to a fifth node N5. The first transistor T1 may be connected between the first node N1 and the second node N2.

According to an embodiment, the first transistor T1 may be an N-type transistor. The cathode CTD of the light emitting element LD may be connected to the drain (or first electrode) of the first transistor T1. For example, although the light emitting element LD is deteriorated, the voltage across the source terminal (or second electrode) of the first transistor T1 may not be shifted. Although the light emitting element LD is deteriorated, the gate-source voltage (referred to as Vgs) of the first transistor T1 may not be changed. Therefore, although the usage time of the pixel PXij is increased, the variation range of the amount of current flowing through the first transistor T1 may be reduced, thereby reducing the afterimage defect (or long-term afterimage defect) of the display panel DP (see FIG. 2), and improving the lifespan of the display panel DP (see FIG. 2). Accordingly, the pixel PXij having the improved display quality and the display device DD (see FIG. 1) including the pixel PXij may be provided.

The second transistor T2 may include a first electrode connected (e.g., electrically connected) to the j-th data line DLj to which the data signal Vdata is provided, a second electrode electrically connected to a fourth node N4, and a gate electrode to receive the scan signal GW. The gate electrode of the second transistor T2 may be connected to the write scan line GWLi. The second transistor T2 may be referred to as a switch transistor. The second transistor T2 may be connected between the j-th data line DLj and the fourth node N4.

The third transistor T3 may include a first electrode connected (e.g., electrically connected) to the first node N1, a second electrode connected (e.g., electrically connected) to the third node N3, and a gate electrode receiving the compensation scan signal GC. The gate electrode of the third transistor T3 may be connected to the compensation scan line GCLi. The third transistor T3 may be connected between the first node N1 and the third node N3.

The fourth transistor T4 may include a first electrode connected (e.g., electrically connected) to the third node N3, a second electrode connected (e.g., electrically connected) to the fourth node N4, and a gate electrode to receive the second light emitting signal EM2. The gate electrode of the fourth transistor T4 may be connected to the second light emitting control line EML2*i*. The fourth transistor T4 may be connected between the third node N3 and the fourth node N4.

The fifth transistor T5 may include a first electrode connected (e.g., electrically connected) to the second node N2, a second electrode connected (e.g., electrically connected) to the second power line PL2, and a gate electrode to receive the second light emitting signal EM2. The gate electrode of the fifth transistor T5 may be connected to the second light emitting control line EML2*i*. The fifth transistor T5 may be connected between the second node N2 and the second power line PL2.

The sixth transistor T6 may include a first electrode connected (e.g., electrically connected) to the first node N1, a second electrode connected (e.g., electrically connected) to the initialization voltage line PL3, and a gate electrode to receive the compensation scan signal GC. The gate electrode of the sixth transistor T6 may be connected (e.g., electrically connected) to the compensation scan line GCLi. The sixth transistor T6 may be connected between the first node N1 and the initialization voltage line PL3.

The seventh transistor T7 may include a first electrode connected (e.g., electrically connected) to the first node N1, a second electrode connected (e.g., electrically connected) to the fifth node N5, and a gate electrode to receive the first light emitting signal EM1. The gate electrode of the seventh transistor T7 may be connected to the first light emitting control line EML1*i*. The seventh transistor T7 may be connected between the first node N1 and the first electrode of the first transistor T1.

The first capacitor Cst may be connected between the second node N2 and the fourth node N4.

In another example, the pixel driving circuit may include at least two capacitors. For example, the pixel driving circuit may include a storage capacitor and a hold capacitor. For example, the capacitance of each of the plurality of capacitors may be proportional to an area. In case that a higher capacitance is required, the area of the capacitor may be increased. Accordingly, the physical area (or size) of the pixel driving circuit may be increased. Accordingly, the number of pixels, which are arranged in a specific area, may be relatively reduced, such that a pixel density may be reduced. However, according to an embodiment, the pixel PXij may include only one capacitor Cst in a 7T-1C structure. The area of the pixel driving circuit PCij may be relatively reduced. The pixel density of the pixel PXij may be increased. Accordingly, a higher-resolution pixel may be easily designed. Accordingly, the pixel PXij having the improved display quality and the display device DD (see FIG. 1) including the same may be provided.

Figure 4:
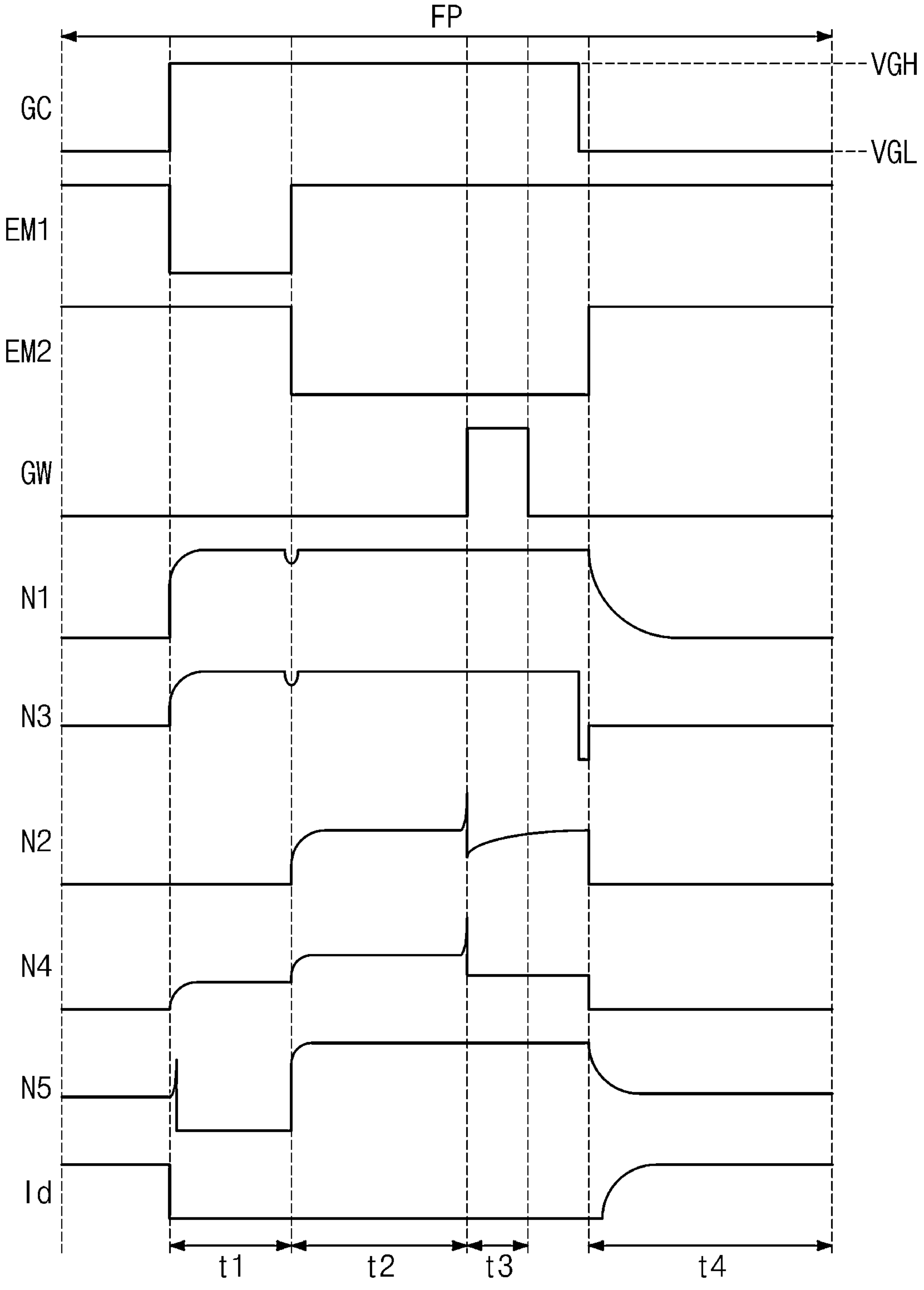
FIG. 4 is a timing diagram illustrating the operation of a display device according to an embodiment.

FIG. 4 is a timing diagram illustrating an operation of the display device according to an embodiment, and FIGS. 5 to 8 are schematic views illustrating an operation of a pixel according to an embodiment. In the following description made with reference to FIGS. 5 to 8, the same reference numerals are assigned to the same components described with reference to FIG. 3, and the details thereof will be omitted for descriptive convenience.

Referring to FIGS. 2 and 4, the display panel DP may operate in unit of a frame duration FP to display the image IM (see FIG. 1). Any one frame duration FP may include first to fourth periods t1, t2, t3, and t4.

The first to third periods t1, t2, and t3 may be referred to as non-emission periods. For example, the first period t1 may be referred to as an initialization period. The second period t2 may be referred to as a compensation period. The third period t3 may be referred to as an input period.

The fourth period t4 may be referred to as a light emitting period.

Figure 5:
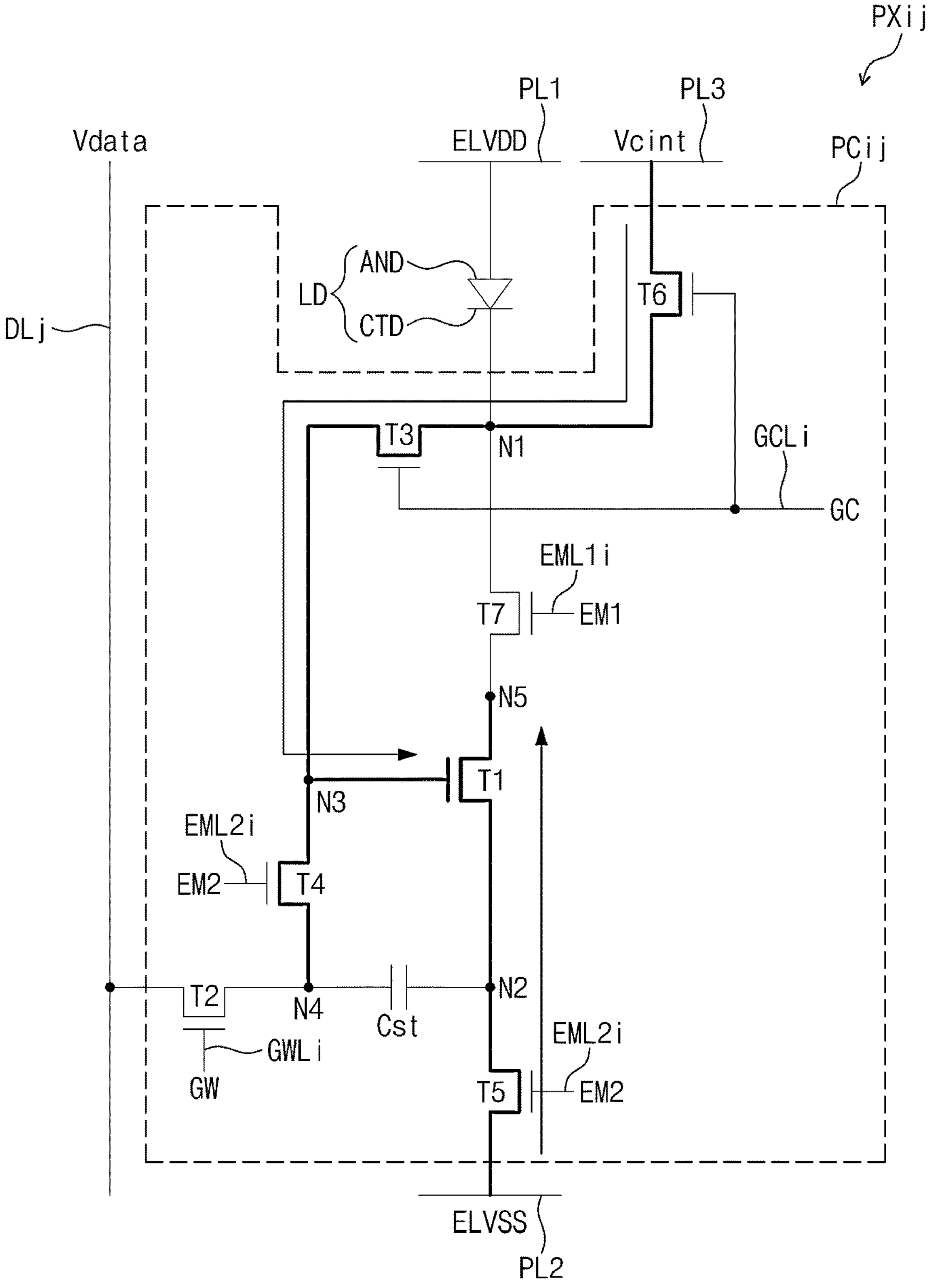
FIGS. 5, 6, 7, and 8 are schematic views illustrating the operation of a pixel according to an embodiment.

FIG. 5 is a schematic view illustrating an operation of the pixel PXij in the first period t1 of the frame duration FP.

Referring to FIGS. 4 and 5, during the first period t1, the compensation scan signal GC and the second light emitting signal EM2 may have an active level. The active level of each of the compensation scan signal GC and the second light emitting signal EM2 may have a high level VGH. However, the embodiment is provided only for the illustrative purpose, and the active level of signals according to an embodiment is not limited thereto. For example, the active level of the signals may be a low level VGL.

The first light emitting signal EM1 and the scan signal GW may have a non-active level. The non-active level of each of the first light emitting signal EM1 and the scan signal GW may be the low level VGL. However, the embodiment is provided only for the illustrative purpose, and the non-active level of signals according to an embodiment is not limited thereto. For example, the non-active level of the signals may be the high level VGH.

The sixth transistor T6 may be turned on in response to the compensation scan signal GC. The initialization voltage Vcint may be provided (or applied) to the first node N1 through the sixth transistor T6. The first node N1 may be charged with the initialization voltage Vcint.

The third transistor T3 may be turned on in response to the compensation scan signal GC. The initialization voltage Vcint may be provided (or applied) to the third node N3 through the sixth transistor T6 and the third transistor T3. The third node N3 may be charged with the initialization voltage Vcint.

During the first period t1, the gate electrode of the first transistor T1 may be initialized to the initialization voltage Vcint. For example, the voltage of the third node N3 may be changed from the data signal Vdata during a previous frame duration, to the initialization voltage Vcint.

The fifth transistor T5 may be turned on in response to the second light emitting signal EM2. The second supply voltage ELVSS may be provided (or applied) to the second node N2 through the fifth transistor T5. The second node N2 may be charged with the second supply voltage ELVSS.

During the first period t1, the source (or second electrode) of the first transistor T1 may be initialized to the second supply voltage ELVSS. The pixel PXij may initialize the source of the first transistor T1 through the second supply voltage ELVSS without using a separate initialization voltage.

According to an embodiment, a separate power line for supplying an initialization voltage to the second electrode of the first transistor T1 may be omitted in the voltage generator 300 (see FIG. 2). The area of the non-display region NDA (see FIG. 1) may be reduced. For example, the number of power lines included in the pixel PXij may be reduced. A gap between lines included in the pixel PXij may be increased. Signal interference between lines may be reduced. Accordingly, the pixel PXij and the display device DD (see FIG. 1) may have improved display quality.

The fourth transistor T4 may be turned on in response to the second light emitting signal EM2. The initialization voltage Vcint may be provided (or applied) to the fourth node N4 through the fourth transistor T4. At least a portion of the initialization voltage Vcint may be charged into the fourth node N4 by the first capacitor Cst.

Figure 6:
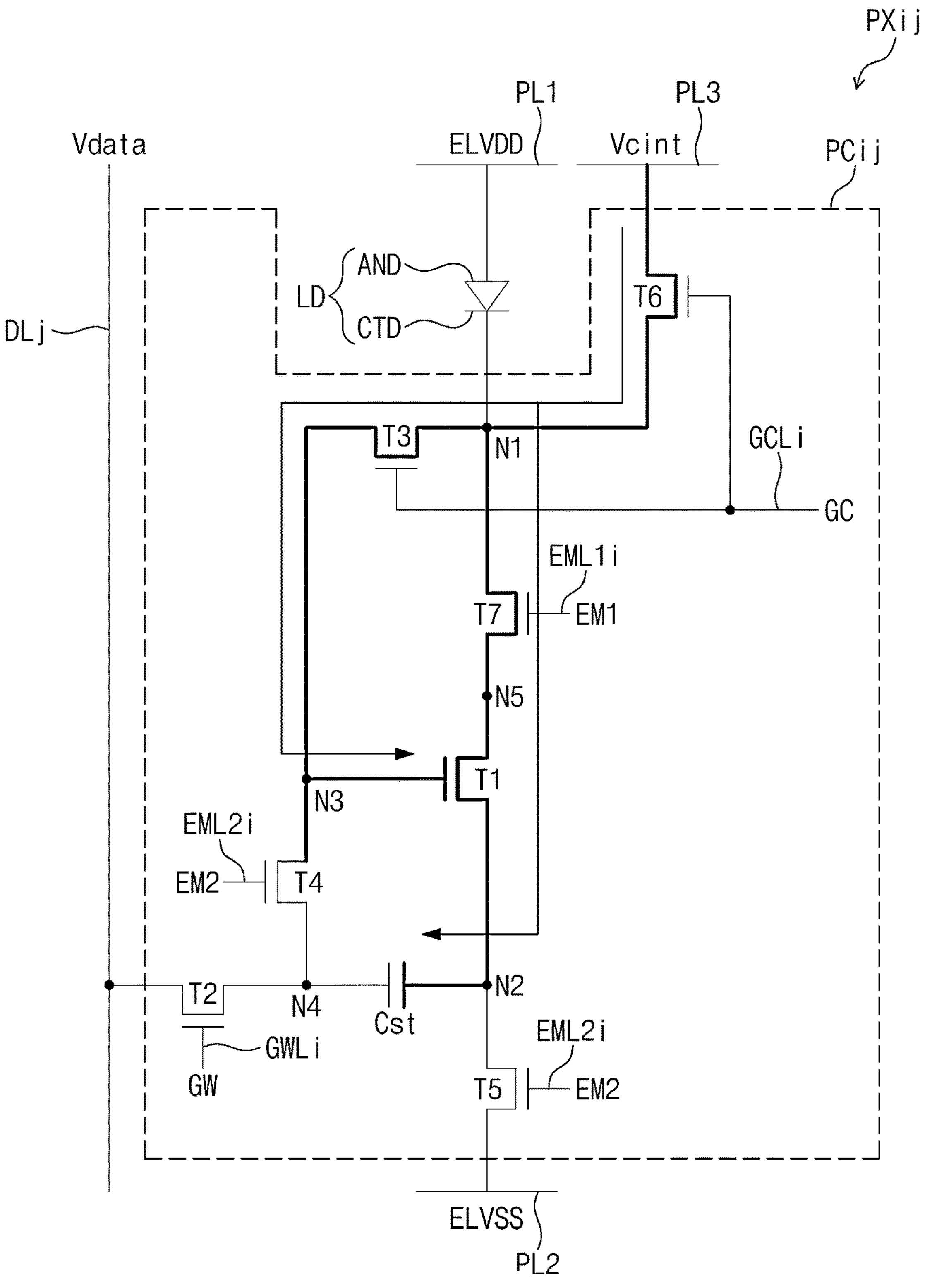

FIG. 6 is a schematic view illustrating an operation of the pixel PXij during the second period t2 of the frame duration FP.

Referring to FIGS. 4 and 6, the second period t2 may be subsequent to first period t1. During the second period t2, the compensation scan signal GC and the first light emitting signal EM1 may have the active level. The active level of each of the compensation scan signal GC and the first light emitting signal EM1 may be the high level VGH.

The second light emitting signal EM2 and the scan signal GW may have a non-active level. The non-active level of each of the second light emitting signal EM2 and the scan signal GW may be the low level VGL.

The sixth transistor T6 may be turned on in response to the compensation scan signal GC. The initialization voltage Vcint may be provided (or applied) to the first node N1 through the sixth transistor T6. The first node N1 may be charged with the initialization voltage Vcint.

The third transistor T3 may be turned on in response to the compensation scan signal GC. The initialization voltage Vcint may be provided (or applied) to the third node N3 through the sixth transistor T6 and the third transistor T3. The third node N3 may be charged with the initialization voltage Vcint.

The first transistor T1 may be turned on in response to the initialization voltage Vcint provided (or applied) to the gate electrode.

The seventh transistor T7 may be turned on in response to the first light emitting signal EM1. The initialization voltage Vcint may be provided (or applied) to the fifth node N5 through the seventh transistor T7. The fifth node N5 may be charged with the initialization voltage Vcint.

During the second period t2, the first transistor T1 may operate as a source follower. A voltage lower than a voltage provided (or applied) to the third node N3 by the threshold voltage Vth of the first transistor T1 may be provided (or applied) to the second node N2. For example, a voltage lower than the initialization voltage Vcint by the threshold voltage of the first transistor T1 may be provided (or applied) to the second node N2. The second node N2 may be charged with a voltage of "Vcint-Vth".

Figure 7:
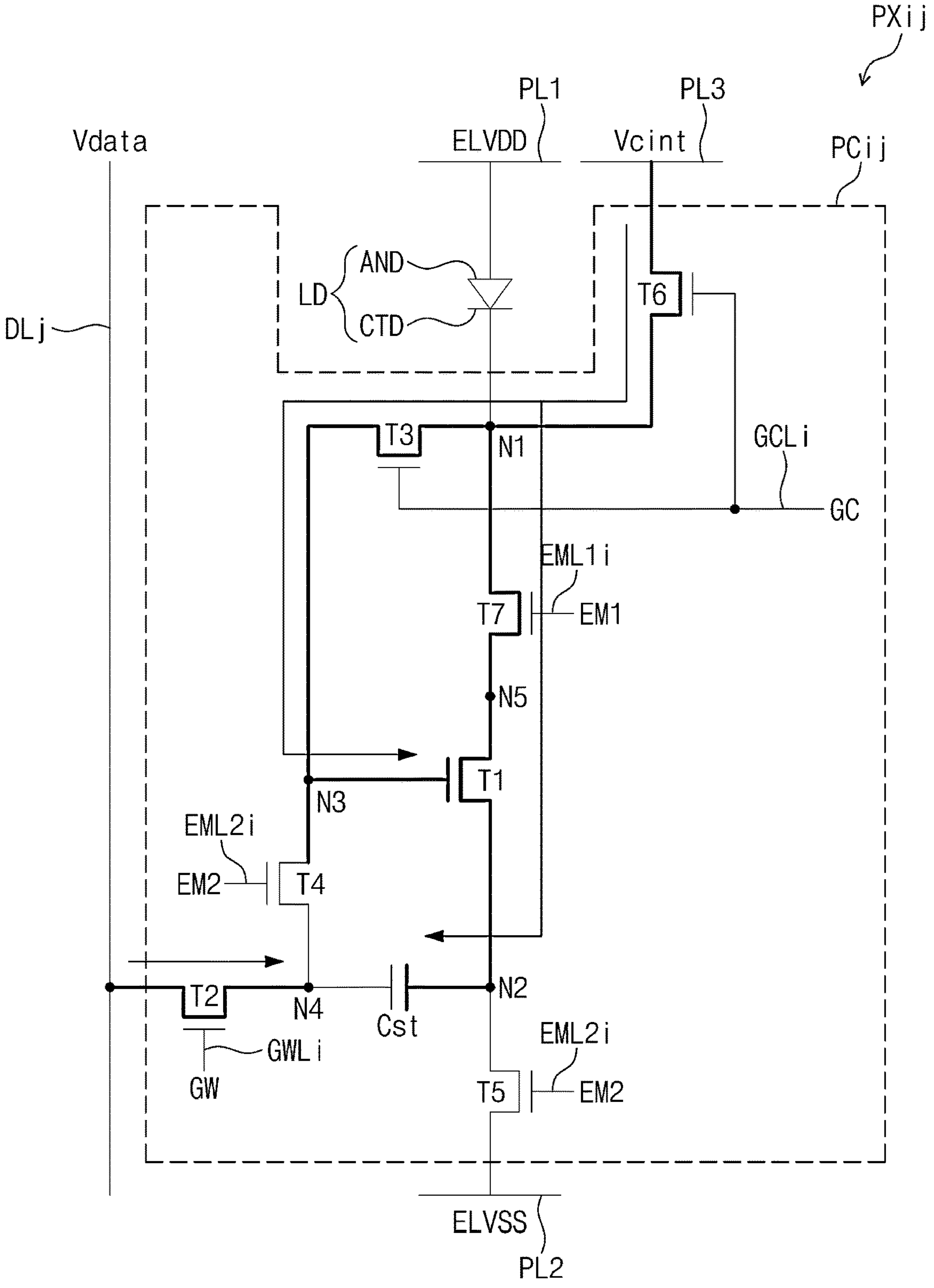

FIG. 7 is a schematic view illustrating an operation of the pixel PXij during the third period t3 during the frame duration FP.

Referring to FIGS. 4 and 7, the third period t3 may be subsequent to the second period t2. During the third period t3, the compensation scan signal GC, the first light emitting signal EM1, and the scan signal GW may have the active level. The active level of each of the compensation scan signal GC, the first light emitting signal EM1, and the scan signal GW may have the high level VGH.

The second light emitting signal EM2 may be the non-active level. The non-active level of each of the second light emitting signal EM2 may have the low level VGL.

The third transistor T3 and the sixth transistor T6 may be turned on in response to the compensation scan signal GC. The first node N1 and the third node N3 may be charged with the initialization voltage Vcint.

The seventh transistor T7 may be turned on in response to the first light emitting signal EM1. The fifth node N5 may be charged with the initialization voltage Vcint.

The first transistor T1 may operate as a source follower. The second node N2 may be charged with a voltage of Vcint-Vth.

The second transistor T2 may be turned on in response to the scan signal GW. The data signal Vdata provided through the j-th data line DLj may be provided (or applied) to the fourth node N4.

The first capacitor Cst may be disposed between the second node N2 and the fourth node N4. The first capacitor Cst may store the differential voltage between the second node N2 and the fourth node N4. The voltage level of one terminal of the first capacitor Cst, e.g., the voltage level of the fourth node N4, may be changed to the voltage level of the data signal Vdata.

As the second transistor T2 is turned on, the voltage of the second node N2 may be increased (e.g., instantaneously increased) by the data signal Vdata and then restored. For example, the voltage level of the second node N2 may change from the voltage of "Vcint−Vth+Vdata" to the voltage of "Vcint-Vth".

The voltage level of an opposite terminal of the first capacitor Cst, e.g., the voltage level of the second node N2, may be a voltage level of "Vcint-Vth". The first capacitor Cst may store charges corresponding to the voltage difference "Vcint-Vth-Vdata" between the second node N2 and the fourth node N4. The first capacitor Cst may be referred to as a storage capacitor.

Figure 8:
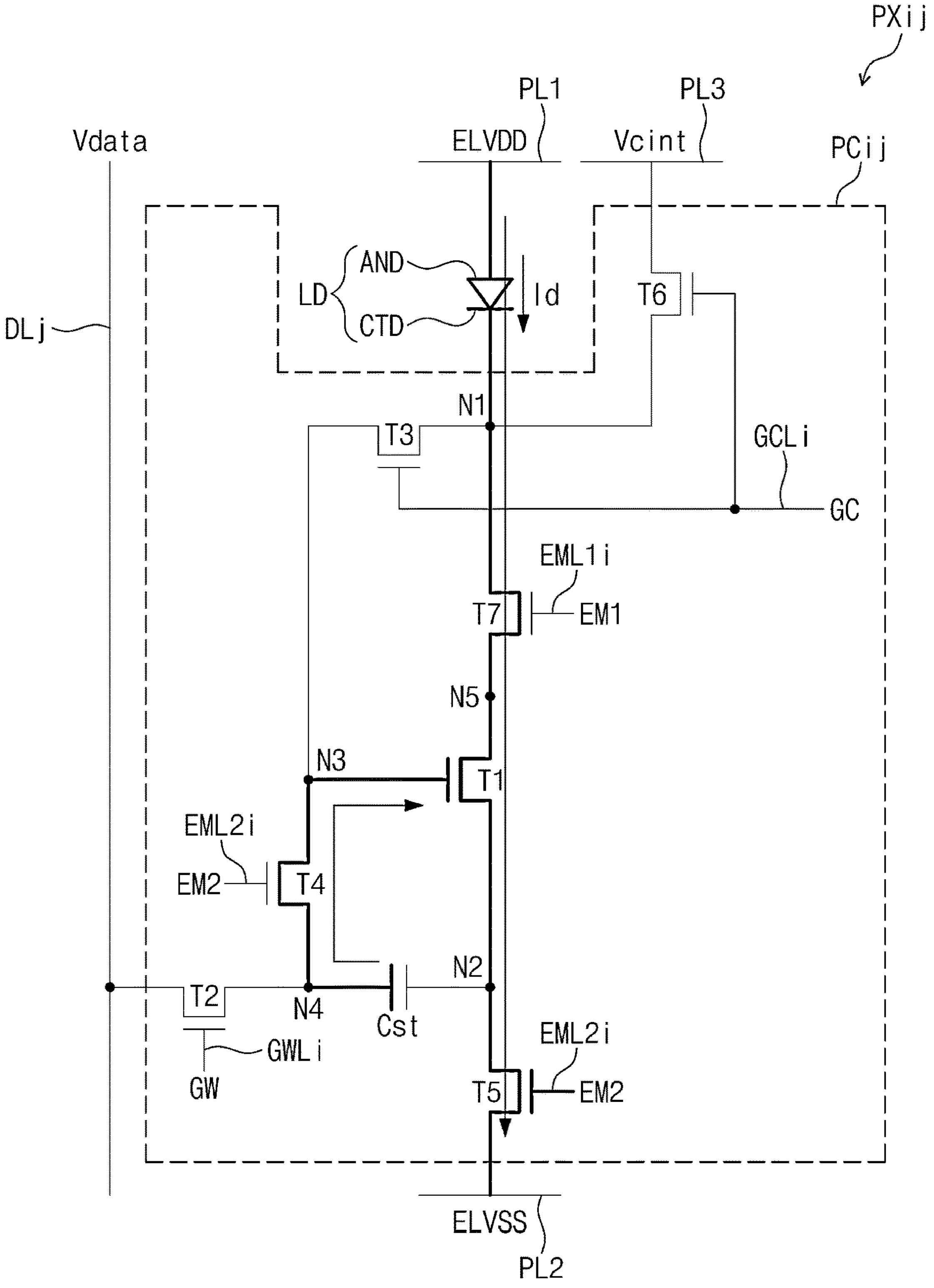

FIG. 8 is a schematic view illustrating an operation of the pixel PXij during the fourth period t4 during the frame duration FP.

Referring to FIGS. 4 and 8, the fourth period t4 may proceed after the third period t3. During the fourth period t4, the first light emitting signal EM1 and the second light emitting signal EM2 may have the active level. The active level of each of the first light emitting signal EM1 and the second light emitting signal EM2 may be the high level VGH.

The compensation scan signal GC and the scan signal GW may have the non-active levels. The non-active level of each of the compensation scan signal GC and the scan signal GW may have the low level VGL.

The seventh transistor T7 may be turned on in response to the first light emitting signal EM1. The fifth transistor T5 may be turned on in response to the second light emitting signal EM2.

As the fifth transistor T5 and the seventh transistor T7 are turned on, a current path may be formed from the first power line PL1 to the light emitting element LD, the seventh transistor T7, the first transistor T1, the fifth transistor T5, and the second power line PL2. For example, the driving current Id may flow through the first power line PL1, the light emitting element LD, the seventh transistor T7, the first transistor T1, the fifth transistor T5, and the second power line PL2.

The voltage value of the second supply voltage ELVSS may be smaller than a value obtained by subtracting the threshold voltage Vth of the first transistor T1 from the initialization voltage Vcint.

In case that the second supply voltage ELVSS is greater than a value obtained by subtracting the threshold voltage Vth of the first transistor T1 from the initialization voltage Vcint, the current path may not be formed. However, according to an embodiment, the second supply voltage ELVSS may be smaller than a value obtained by subtracting the threshold voltage Vth of the first transistor T1 from the initialization voltage Vcint. The current path may be easily formed. The light emitting element LD may easily emit light. Accordingly, the pixel PXij and the display device DD (see FIG. 1) having improved display quality may be provided.

The fourth transistor T4 may be turned on in response to the second light emitting signal EM2. A voltage as much as the electric charges stored in the first capacitor Cst may be provided (or applied) to the gate voltage of the first transistor T1 through the fourth node N4 and the third node N3.

As the data signal Vdata output from the data driving circuit 200 (see FIG. 2) of the display panel DP (see FIG. 2) is written, the light emitting element LD may emit light. The driving current Id may be expressed as the following equations.

$$Id = \frac{1}{2} \cdot \mu \cdot Cox \cdot \frac{W}{L}(Vgs - Vth)^2 \quad \text{[Equation 1]}$$

$$\alpha = \frac{1}{2} \cdot \mu \cdot Cox \cdot \frac{W}{L} \quad \text{[Equation 2]}$$

$$Vgs = (Vdata + (ELVSS - (Vcint - Vth))) - ELVSS \quad \text{[Equation 3]}$$

$$Id = \alpha((Vdata + (ELVSS - (Vcint - Vth))) - ELVSS - Vth)^2 \quad \text{[Equation 4]}$$

$$Id = \alpha(Vdata - Vcint)^2 \quad \text{[Equation 5]}$$

In the above equations, "u" may be the electric field mobility, "Cox" is the capacitance of the gate insulating layer, "W" and "L" may be the width and length of the first transistor T1, and "Vgs" may be a gate-source voltage of the first transistor T1. For example, "u" and "Cox" may be constants. For example, "a" may be a constant.

The gate-source voltage of the first transistor T1 may be a differential voltage obtained by subtracting the voltage of the second node N2 from the voltage of the third node N3.

Equation 4 may be a summary of Equations 2 and 3 in Equation 1. Equation 5 may be a summary of Equation 4.

The threshold voltage Vth of the first transistor T1 included in each of the pixels PX (see FIG. 2) may be varied according to the characteristics of the first transistor T1. However, according to an embodiment, the threshold voltage Vth of the first transistor T1 may not affect the driving current Id flowing through the light emitting element LD for the first to fourth periods t1, t2, t3, and t4. Referring to Equation 5, the driving current Id flowing through the light emitting element LD during the fourth period t4 may not be affected (or influenced) by the threshold voltage Vth of the first transistor T1. The driving current Id may be proportional to the square of a difference between the data signal Vdata and the initialization voltage Vcint regardless of the characteristics of the first transistor T1. Accordingly, the brightness of the image IM output from the display panel DP (see FIG. 2) may be maintained to be uniform. Accordingly, the pixel PXij and the display device DD (see FIG. 1) having improved display quality may be provided.

A voltage level of the first supply voltage ELVDD in the first power line PL1 may be changed due to a voltage drop (referred to as IR drop) phenomenon. For example, a voltage level of the second supply voltage ELVSS in the second power line PL2 may be changed due to a voltage drop phenomenon. However, according to an embodiment, the first supply voltage ELVDD and the second supply voltage ELVSS may not affect the driving current Id flowing through the light emitting element LD for the first to fourth periods t1, t2, t3, and t4. Referring to Equation 5, the driving current Id flowing through the light emitting element LD during the fourth period t4 may not be affected (or influenced) by the first supply voltage ELVDD and the second supply voltage ELVSS. The driving current Id may be proportional to the square of a difference between the data signal Vdata and the initialization voltage Vcint regardless of voltage values of the first supply voltage ELVDD and the second supply voltage ELVSS. Accordingly, the brightness of the image IM output from the display panel DP (see FIG. 2) may be maintained to be uniform. Accordingly, the pixel PXij and the display device DD (see FIG. 1) having improved display quality may be provided.

Furthermore, according to an embodiment, the first transistor T1 may be an N-type transistor, and the cathode CTD of the light emitting element LD may be connected (e.g., electrically connected) to the drain (or first electrode) of the first transistor T1. For example, although the light emitting element LD is deteriorated, the voltage of the source terminal of the first transistor T1, which affects the driving current Id, may not be shifted. For example, although the light emitting element LD is deteriorated, the gate-source voltage Vgs of the first transistor T1 may not be changed. Accordingly, although the usage time is increased, the variation range of the amount of current flowing through the first transistor T1 may be reduced, such that an afterimage defect (or a long-term afterimage defect) of the display panel DP (see FIG. 2) may be reduced, and the lifespan of the display panel DP (see FIG. 2) may be improved. Accordingly, the pixel PXij and the display device DD (see FIG. 1) having improved display quality may be provided.

Figure 9:
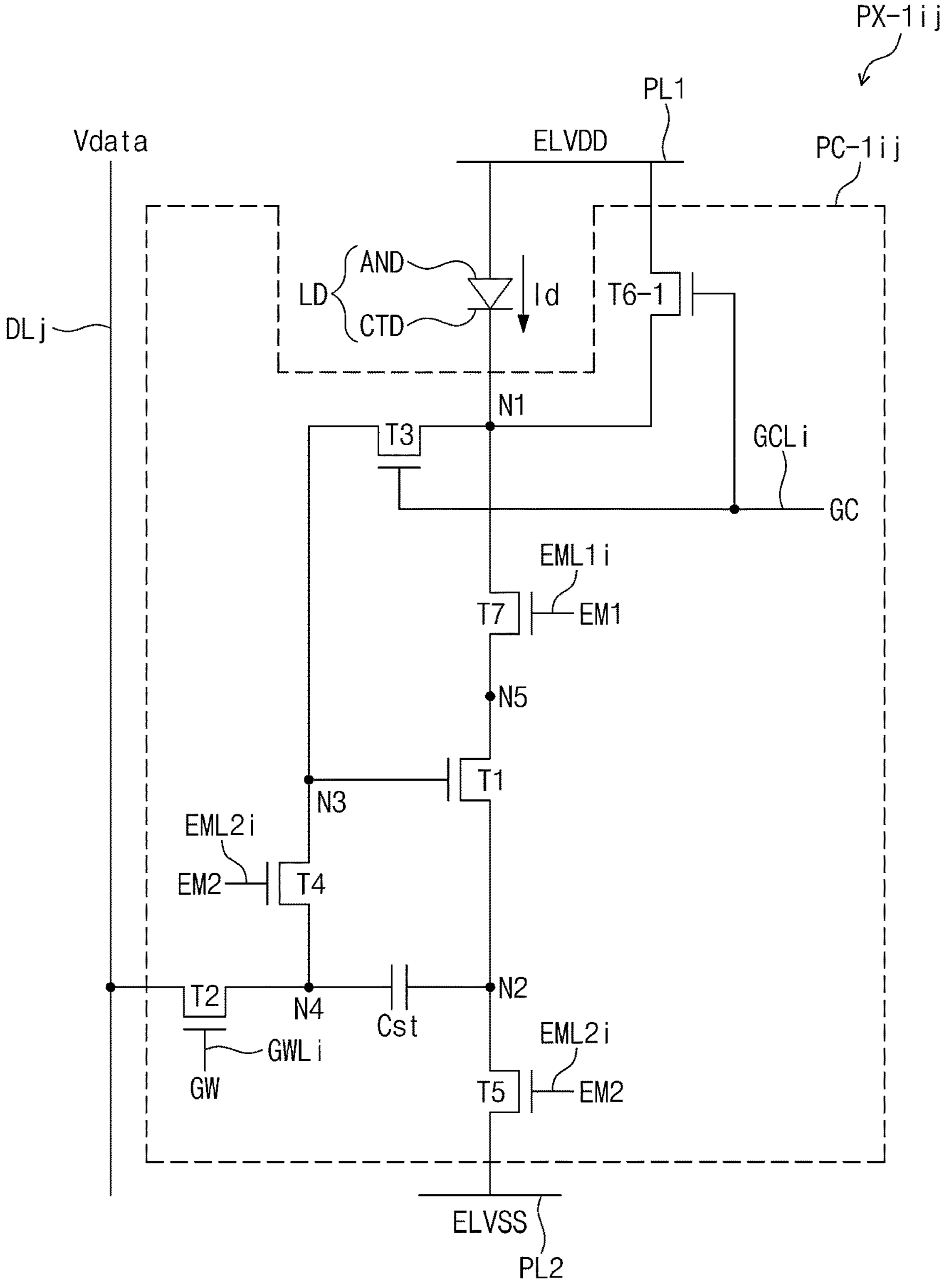
FIG. 9 is a schematic diagram of an equivalent circuit of a pixel according to an embodiment.

FIG. 9 is a schematic diagram of an equivalent circuit of a pixel according to an embodiment. In the following description made with reference to FIG. 9, the same reference numerals will be assigned to the same components described with reference to FIG. 3, and the details thereof will be omitted for descriptive convenience.

Referring to FIGS. 4 and 9, a pixel PX-1*ij* may include the light emitting element LD and a pixel driving circuit PC-1*ij*.

The pixel driving circuit PC-1*ij* may include the first to fifth transistors, a (6-1)-th transistor T6-1, and the seventh transistor T7, and the first capacitor Cst.

The (6-1)-th transistor T6-1 may include a first electrode connected (e.g., electrically connected) to the first node N1, a second electrode connected (e.g., electrically connected) to the first power line PL1, and a gate electrode to receive the compensation scan signal GC. The gate electrode of the (6-1)-th transistor T6-1 may be connected (e.g., electrically connected) to the compensation scan line GCLi.

According to an embodiment, a separate power line to supply an initialization voltage to the gate electrode of the first transistor T1 may be omitted in the voltage generator 300 (see FIG. 2). The area of the non-display region NDA (see FIG. 1) may be reduced. For example, the number of power lines included in the pixel PX-1*ij* may be reduced. A gap between lines included in the pixel PX-1*ij* may be increased. Signal interference between lines may be reduced. Accordingly, the pixel PX-1*ij* and the display device DD (see FIG. 1) having improved display quality may be provided.

The pixel PX-1*ij* may be driven during the first to fourth periods t1, t2, t3, and t4.

The third node N3 may be initialized to the first supply voltage ELVDD during the first period t1 through the (6-1)-th transistor T6-1.

As data signals output from the data driving circuit 200 (see FIG. 2) of the display panel DP (see FIG. 2) are written, the light emitting element LD may emit light. The driving current Id may be expressed as the following equation.

$$Id = \alpha(Vdata - ELVDD)^2 \quad \text{[Equation 6]}$$

The threshold voltage Vth of the first transistor T1 included in the pixel PX-1*ij* may be varied according to the characteristics of the first transistor T1. However, according to an embodiment, the threshold voltage Vth of the first transistor T1 may not affect the driving current Id flowing through the light emitting element LD through the first to fourth periods t1, t2, t3, and t4. Referring to Equation 6, the driving current Id flowing through the light emitting element LD during the fourth period t4 may not be affected (or influenced) by the threshold voltage Vth of the first transistor T1. The driving current Id may be proportional to the square of the difference between the data signal Vdata and the first supply voltage ELVDD regardless of the characteristics of the first transistor T1. Accordingly, the brightness of the image IM output from the display panel DP (see FIG. 2) may be maintained to be uniform. Accordingly, the pixel PX-1*ij* and the display device DD (see FIG. 1) having improved display quality may be provided.

For example, a voltage level of the second supply voltage ELVSS in the second power line PL2 may be changed due to a voltage drop phenomenon. However, according to an embodiment, the second supply voltage ELVSS may not affect the driving current Id flowing through the light emitting element LD by the first to fourth periods t1, t2, t3, and t4. Referring to Equation 6, during the fourth period t4, the driving current Id flowing through the light emitting element LD may not be affected (or influenced) by the second supply voltage ELVSS. The light emitting element LD may be proportional to the square of a difference between the data signal Vdata and the first supply voltage ELVDD regardless of the voltage value of the second supply voltage ELVSS. Accordingly, the brightness of the image IM output from the display panel DP (see FIG. 2) may be maintained to be uniform. Accordingly, the pixel PX-1*ij* and the display device DD (see FIG. 1) having improved display quality may be provided.

Furthermore, according to an embodiment, the first transistor T1 may be an N-type transistor, and the cathode CTD of the light emitting element LD may be connected (e.g., electrically connected) to the drain of the first transistor T1. For example, although the light emitting element LD is deteriorated, the voltage of the source terminal of the first transistor T1, which affects the driving current Id, may not be shifted. For example, although the light emitting element LD is deteriorated, the gate-source voltage Vgs of the first transistor T1 may not be changed. Accordingly, although the usage time is increased, the variation range of the amount of current flowing through the first transistor T1 may be reduced, such that an afterimage defect (or a long-term afterimage defect) of the display panel DP (see FIG. 2) may be reduced, and the life of the display panel DP (see FIG. 2) may be improved. Accordingly, the pixel PX-1*ij* and the display device DD (see FIG. 1) having improved display quality may be provided.

Figure 10:
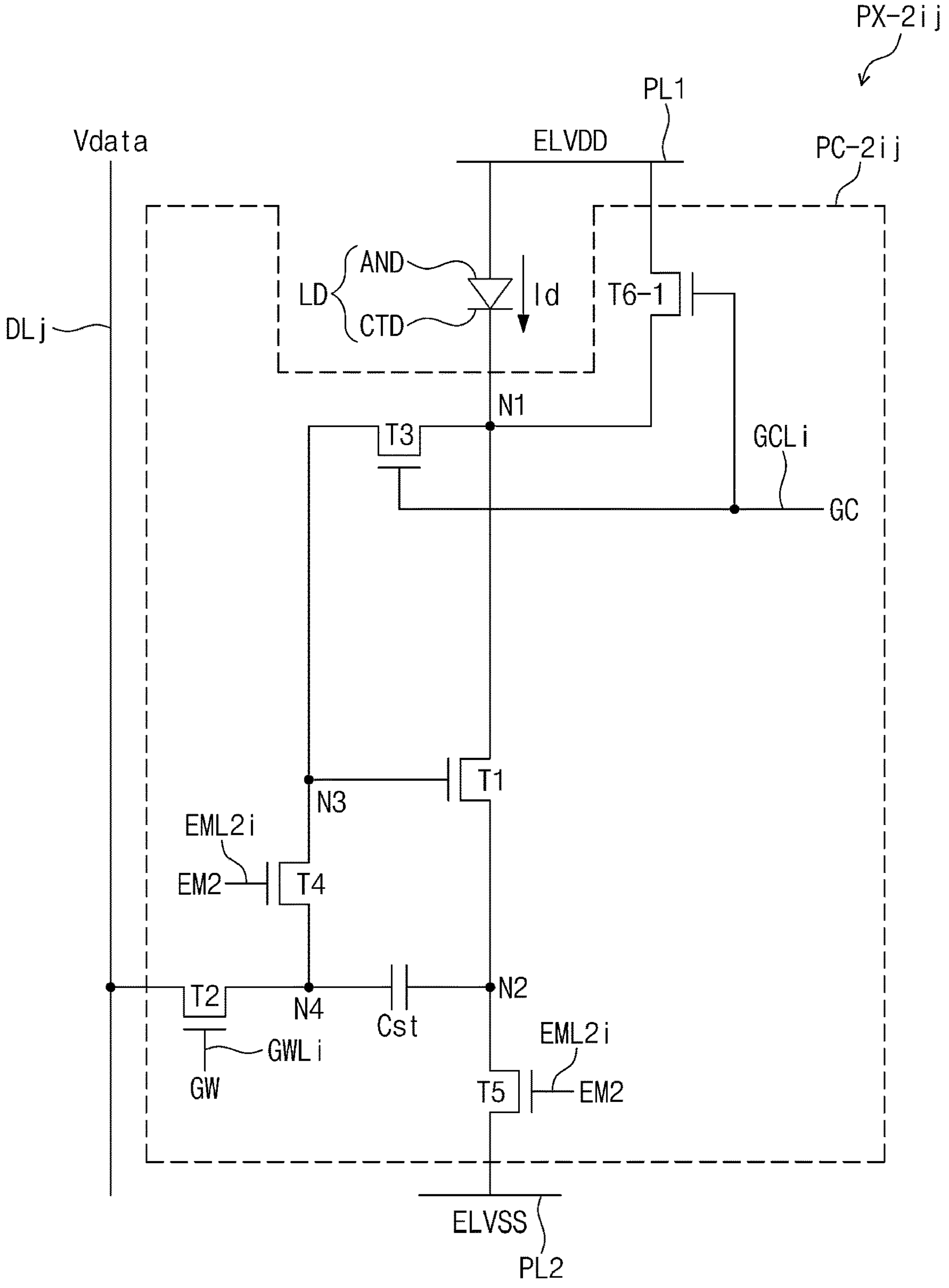
FIG. 10 is a schematic diagram of an equivalent circuit of a pixel according to an embodiment.
Figure 11:
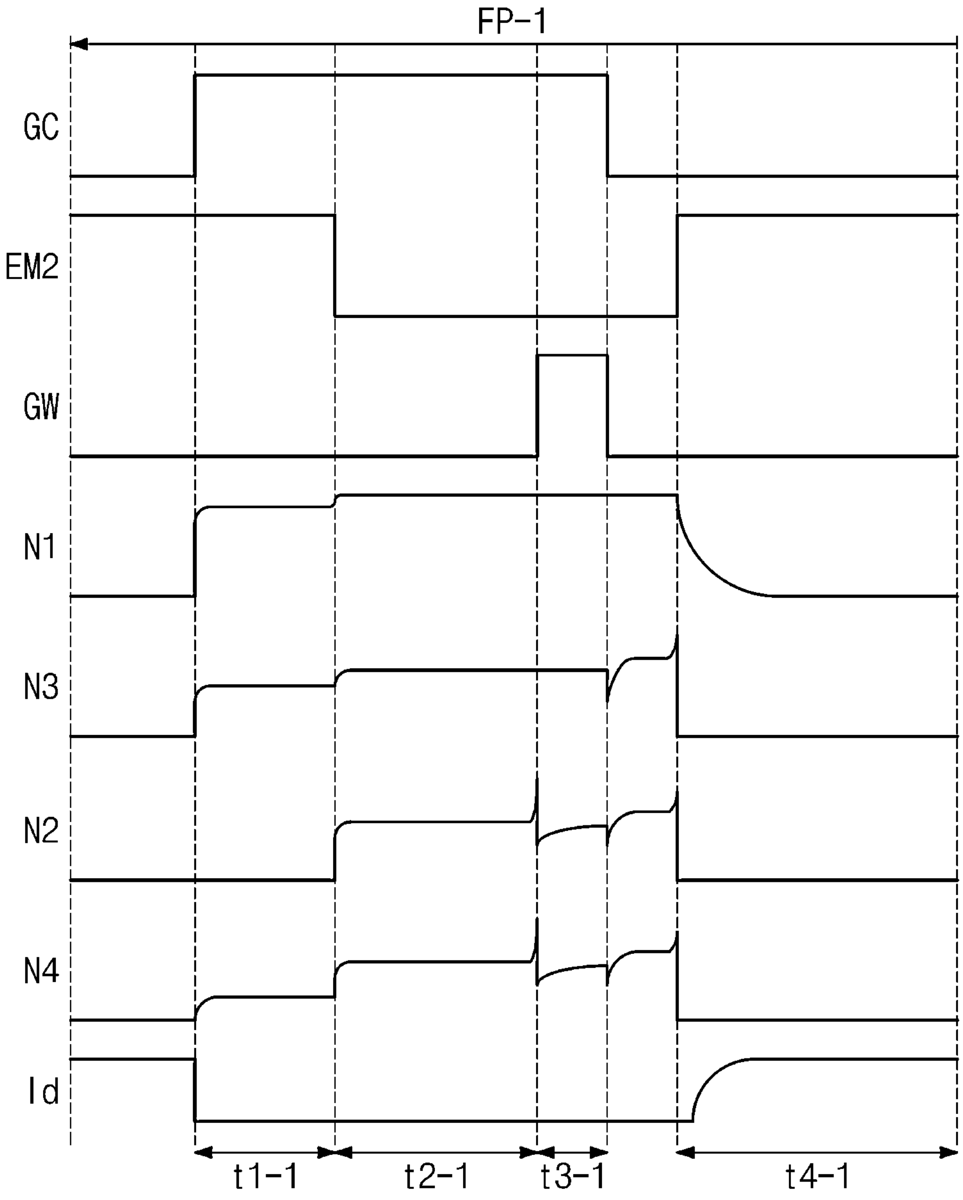
FIG. 11 is a timing diagram illustrating the operation of a display device according to an embodiment.

FIG. 10 is a schematic diagram of an equivalent circuit of a pixel according to an embodiment, and FIG. 11 is a timing diagram illustrating an operation of the display device according to an embodiment. In the following description made with reference to FIG. 10, the same reference numerals are assigned to the same components described with reference to FIG. 9, and the details thereof will be omitted for descriptive convenience. For example, in the following description made with reference to FIG. 11, the same reference numerals are assigned to the same components described with reference to FIG. 4, and the details thereof will be omitted for descriptive convenience.

Referring to FIGS. 10 and 11, a pixel PX-2*ij* may include the light emitting element LD and a pixel driving circuit PC-2*ij*.

The pixel driving circuit PC-2*ij* may include the first to sixth transistors T1, T2, T3, T4, T5, and T6-1 and the first capacitor Cst.

The first electrode of the first transistor T1 may be connected (e.g., directly connected) to the first node N1.

The pixel PX-2*ij* according to an embodiment may be referred to as having a 6T-1C structure.

According to an embodiment, in the light emitting driving circuit EDC (see FIG. 2), the first light emitting control lines EML11 to EML1*n* (see FIG. 2) for providing a first light emitting signal to the pixel PX-2*ij* may be omitted. The area of the non-display region NDA (see FIG. 1) may be reduced. For example, the number of light emitting control lines included in the pixel PX-2*ij* may be reduced. A gap between lines included in the pixel PX-2*ij* may be increased. Signal interference between the lines may be reduced. Accordingly, the pixel PX-2*ij* and the display device DD (see FIG. 1) having improved display quality may be provided.

The pixel driving circuit PC-2*ij* according to an embodiment may have a structure from which the seventh transistor T7 (see FIG. 9) is omitted from the pixel driving circuit PC-1*ij* (see FIG. 9). According to an embodiment, an area of the pixel driving circuit PC-2*ij* may be relatively reduced. The pixel density of the pixel PX-2*ij* may be increased. Accordingly, the pixel PX-2*ij* having the improved display quality and the display device DD including the same may be provided.

The display panel DP (see FIG. 2) may be operated in unit of a frame duration FP-1 to display the image IM (see FIG. 1). Any one frame duration FP-1 may include first to fourth periods t1-1, t2-1, t3-1, and t4-1.

The first to third periods t1-1, t2-1, and t3-1 may be referred to as non-light emitting periods. For example, the first period t1-1 may be referred to as an initialization period. The second period t2-1 may be referred to as a compensation period. The third period t3-1 may be referred to as an input period.

The fourth period t4-1 may be referred to as a light emitting period.

During the first period t1-1, the compensation scan signal GC and the second light emitting signal EM2 may have the active level. The scan signal GW may have the non-active level.

The (6-1)-th transistor T6-1 may be turned on in response to a compensation scan signal GC. The first supply voltage ELVDD may be provided (or applied) to the first node N1 through the (6-1)-th transistor T6-1. The first node N1 may be charged with the first supply voltage ELVDD.

The third transistor T3 may be turned on in response to the compensation scan signal GC. The first supply voltage ELVDD may be provided (or applied) to the third node N3 through the sixth transistor T6 and the third transistor T3. The third node N3 may be charged with the first supply voltage ELVDD.

During the first period t1-1, the gate electrode of the first transistor T1 may be initialized to the first supply voltage ELVDD. For example, the voltage of the third node N3 may be changed from the data signal Vdata for a previous frame duration to the first supply voltage ELVDD.

The fifth transistor T5 may be turned on in response to the second light emitting signal EM2. The second supply voltage ELVSS may be provided (or applied) to the second node N2 through the fifth transistor T5. The second node N2 may be charged with the second supply voltage ELVSS.

The second period t2-1 may be subsequent to the first period t1-1. During the second period t2-1, the compensation scan signal GC may have the active level. The second light emitting signal EM2 and the scan signal GW may have the non-active levels.

The first transistor T1 may be turned on in response to the first supply voltage ELVDD provided (or applied) to the gate electrode by the third transistor T3 and the (6-1)-th transistor T6-1.

During the second period t2-1, the first transistor T1 may operate as a source follower. A voltage lower than a voltage provided (or applied) to the third node N3 by the threshold voltage of the first transistor T1 may be provided (or applied) to the second node N2. The second node N2 may be charged with a voltage of "ELVDD-Vth".

The third period t3-1 may be subsequent to the second period t2-1. During the third period t3-1, the compensation scan signal GC and the scan signal GW may have the active level. The second light emitting signal EM2 may have the non-active level.

The second transistor T2 may be turned on in response to the scan signal GW. The data signal Vdata provided through the j-th data line DLj may be provided (or applied) to the fourth node N4.

The first capacitor Cst may be interposed between the second node N2 and the fourth node N4. The first capacitor Cst may store the differential voltage between the second node N2 and the fourth node N4. The voltage level of one terminal of the first capacitor Cst, e.g., the voltage level of the fourth node N4, may be changed to the voltage level of the data signal Vdata. For example, the voltage level of an opposite terminal of the first capacitor Cst, e.g., the voltage level of the second node N2, may be the voltage level of "ELVDD-Vth". The first capacitor Cst may store charges corresponding to the voltage difference "ELVDD-Vth-Vdata" between the second node N2 and the fourth node N4.

The fourth period t4-1 may proceed after the third period t3-1. During the fourth period t4-1, the second light emitting signal EM2 may have the active level. The compensation scan signal GC and the scan signal GW may have the non-active level.

The fifth transistor T5 may be turned on in response to the second light emitting signal EM2.

As the fifth transistor T5 is turned on, a current path may be formed from the first power line PL1 to the light emitting element LD, the first transistor T1, the fifth transistor T5, and the second power line PL2. For example, the driving current Id may flow through the first power line PL1, the light emitting element LD, the first transistor T1, the fifth transistor T5, and the second power line PL2.

The driving current Id of the pixel PX-2*ij* may be calculated through Equation 6.

The threshold voltage Vth of the first transistor T1 included in each of the pixels PX (see FIG. 2) may be varied according to the characteristics of the first transistor T1. However, according to an embodiment, the threshold voltage Vth of the first transistor T1 may not affect the driving current Id flowing through the light emitting element LD for the first to fourth periods t1-1, t2-1, t3-1, and t4-1. Referring to Equation 6, the driving current Id flowing through the light emitting element LD during the fourth period t4 may not be affected (or influenced) by the threshold voltage Vth of the first transistor T1. The driving current Id may be proportional to the square of a difference between the data signal Vdata and the first supply voltage ELVDD regardless of the characteristics of the first transistor T1. Accordingly, the brightness of the image IM output from the display panel DP (see FIG. 2) may be maintained to be uniform. Accordingly, the pixel PX-2*ij* and the display device DD (see FIG. 1) having the improved display quality may be provided.

For example, a voltage level of the second supply voltage ELVSS in the second power line PL2 may be changed due to a voltage drop phenomenon. However, according to an embodiment, the second supply voltage ELVSS may not affect the driving current Id flowing through the light emitting element LD for the first to fourth periods t1-1, t2-1, t3-1, and t4-1. Referring to Equation 6, the driving current Id flowing through the light emitting element LD during the fourth period t4-1 may not be affected (or influenced) by the second supply voltage ELVSS. The driving current Id may be proportional to the square of a difference between the data signal Vdata and the first supply voltage ELVDD regardless of a voltage value of the second supply voltage ELVSS. Accordingly, the brightness of the image IM output from the display panel DP (see FIG. 2) may be maintained to be uniform. Accordingly, the pixel PX-2*ij* and the display device DD (see FIG. 1) having improved display quality may be provided.

For example, according to an embodiment, the first transistor T1 may be an N-type transistor, and the cathode CTD of the light emitting element LD may be connected (e.g., electrically connected) to the drain of the first transistor T1. For example, although the light emitting element LD is deteriorated, the voltage of the source terminal of the first transistor T1, which affects the driving current Id, may not be shifted. For example, although the light emitting element LD is deteriorated, the gate-source voltage Vgs of the first transistor T1 may not be changed. Accordingly, although the usage time is increased, the variation width of the amount of current flowing through the first transistor T1 may be reduced, such that an afterimage defect (or a long-term afterimage defect) of the display panel DP (see FIG. 2) may be reduced, and the lifespan of the display panel DP (see FIG. 2) may be improved. Accordingly, the pixel PX-2*ij* having improved display quality and the display device DD (see FIG. 1) may be provided.

Figure 12:
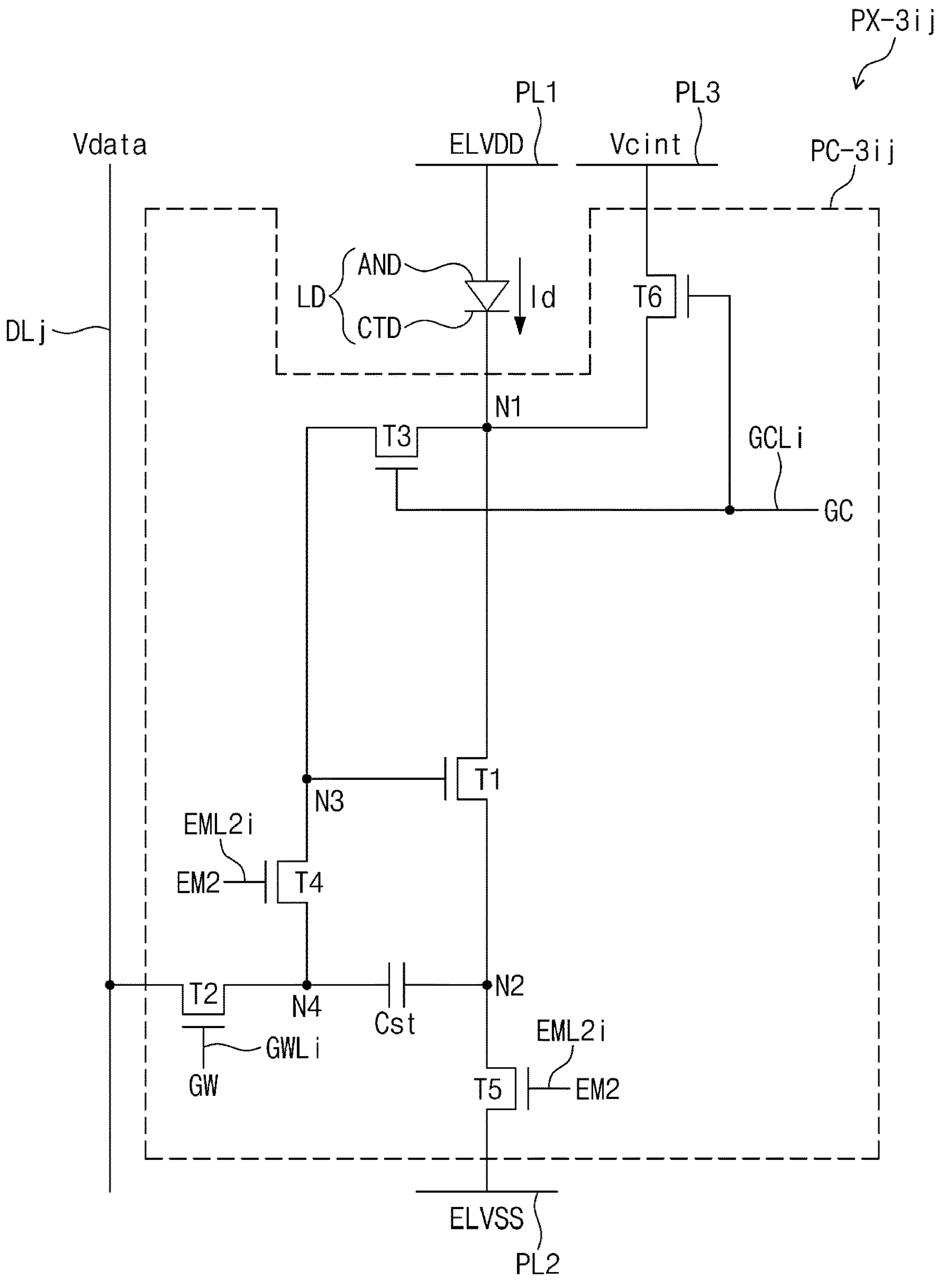
FIG. 12 is a schematic diagram of an equivalent circuit of a pixel according to an embodiment.

FIG. 12 is a schematic diagram of an equivalent circuit of a pixel according to an embodiment. In the following description made with reference to FIG. 12, the same reference numerals are assigned to the same components described with reference to FIG. 3, and the details thereof will be omitted for descriptive convenience.

Referring to FIGS. 11 and 12, a pixel PX-3*ij* may include the light emitting element LD and a pixel driving circuit PC-3*ij*.

The pixel driving circuit PC-3*ij* may include the first to sixth transistors T1, T2, T3, T4, T5, and T6 and the first capacitor Cst.

The first electrode of the first transistor T1 may be connected (e.g., directly connected) to the first node N1.

The pixel PX-3*ij* according to an embodiment may be referred to as having a 6T-1C structure.

The pixel driving circuit PC-3*ij* according to an embodiment may have a structure in which the seventh transistor T7 (see FIG. 9) is omitted from the pixel driving circuit PCij (see FIG. 3).

According to an embodiment, in the light emitting driving circuit EDC (see FIG. 2), the first light emitting control lines EML11 to EML1*n* (see FIG. 2) for providing the first light emitting signal to the pixel PX-3*ij* may be omitted. The area of the non-display region NDA (see FIG. 1) may be reduced. For example, the number of light emitting control lines included in the pixel PX-3*ij* may be reduced. A gap between lines included in the pixel PX-3*ij* may be increased. Signal interference between the lines may be reduced. Accordingly, the pixel PX-3*ij* and the display device DD (see FIG. 1) having improved display quality may be provided.

The pixel driving circuit PC-3*ij* according to an embodiment may have a structure from which the seventh transistor T7 (see FIG. 3) is omitted from the pixel driving circuit PCij (see FIG. 3). According to an embodiment, an area of the pixel driving circuit PC-3*ij* may be relatively reduced. The pixel density of the pixel PX-3*ij* may be increased. Accordingly, the pixel PX-3*ij* having the improved display quality and the display device DD including the same may be provided.

The driving current Id of the pixel PX-3*ij* may be calculated through Equation 5.

The threshold voltage Vth of the first transistor T1 included in each of the pixels PX (see FIG. 2) may be varied according to the characteristics of the first transistor T1. However, according to an embodiment, the threshold voltage Vth of the first transistor T1 may not affect the driving current Id flowing through the light emitting element LD for the first to fourth periods t1-1, t2-1, t3-1, and t4-1. Referring to Equation 5, the driving current Id flowing through the light emitting element LD during the fourth period t4-1 may not be affected (or influenced) by the threshold voltage Vth of the first transistor T1. The driving current Id may be proportional to the square of a difference between the data signal Vdata and the initialization voltage Vcint regardless of the characteristics of the first transistor T1. Accordingly, the brightness of the image IM output from the display panel DP (see FIG. 2) may be maintained to be uniform. Accordingly, the pixel PX-3*ij* and the display device DD (see FIG. 1) having improved display quality may be provided.

The voltage level of the first supply voltage ELVDD in the first power line PL1 may be changed due to the voltage drop phenomenon. For example, a voltage level of the second supply voltage ELVSS in the second power line PL2 may be changed due to a voltage drop phenomenon. However, according to an embodiment, the first supply voltage ELVDD and the second supply voltage ELVSS may not affect the driving current Id flowing through the light emitting element LD for the first to fourth periods t1-1, t2-1, t3-1, and t4-1. Referring to Equation 5, the driving current Id flowing through the light emitting element LD in the fourth period t4-1 may not be affected (or influenced) by the first supply voltage ELVDD and the second supply voltage ELVSS. The driving current Id may be proportional to the square of a difference between the data signal Vdata and the initialization voltage Vcint regardless of voltage values of the first supply voltage ELVDD and the second supply voltage ELVSS. Accordingly, the brightness of the image IM output from the display panel DP (see FIG. 2) may be maintained to be uniform. Accordingly, the pixel PX-3*ij* and the display device DD (see FIG. 1) having improved display quality may be provided.

Furthermore, according to an embodiment, the first transistor T1 may be an N-type transistor, and the cathode CTD of the light emitting element LD may be connected (e.g., electrically connected) to the drain (or first electrode) of the first transistor T1. For example, although the light emitting element LD is deteriorated, the voltage of the source terminal of the first transistor T1, which affects the driving current Id, may not be shifted. For example, although the light emitting element LD is deteriorated, the gate-source voltage Vgs of the first transistor T1 may not be changed. Accordingly, although the usage time is increased, the variation width of the amount of current flowing through the first transistor T1 may be reduced, such that an afterimage defect (or a long-term afterimage defect) of the display panel DP (see FIG. 2) may be reduced, and the lifespan of the display panel DP (see FIG. 2) may be improved. Accordingly, the pixel PX-3*ij* with improved display quality and the display device DD (see FIG. 1) may be provided.

Figure 13:
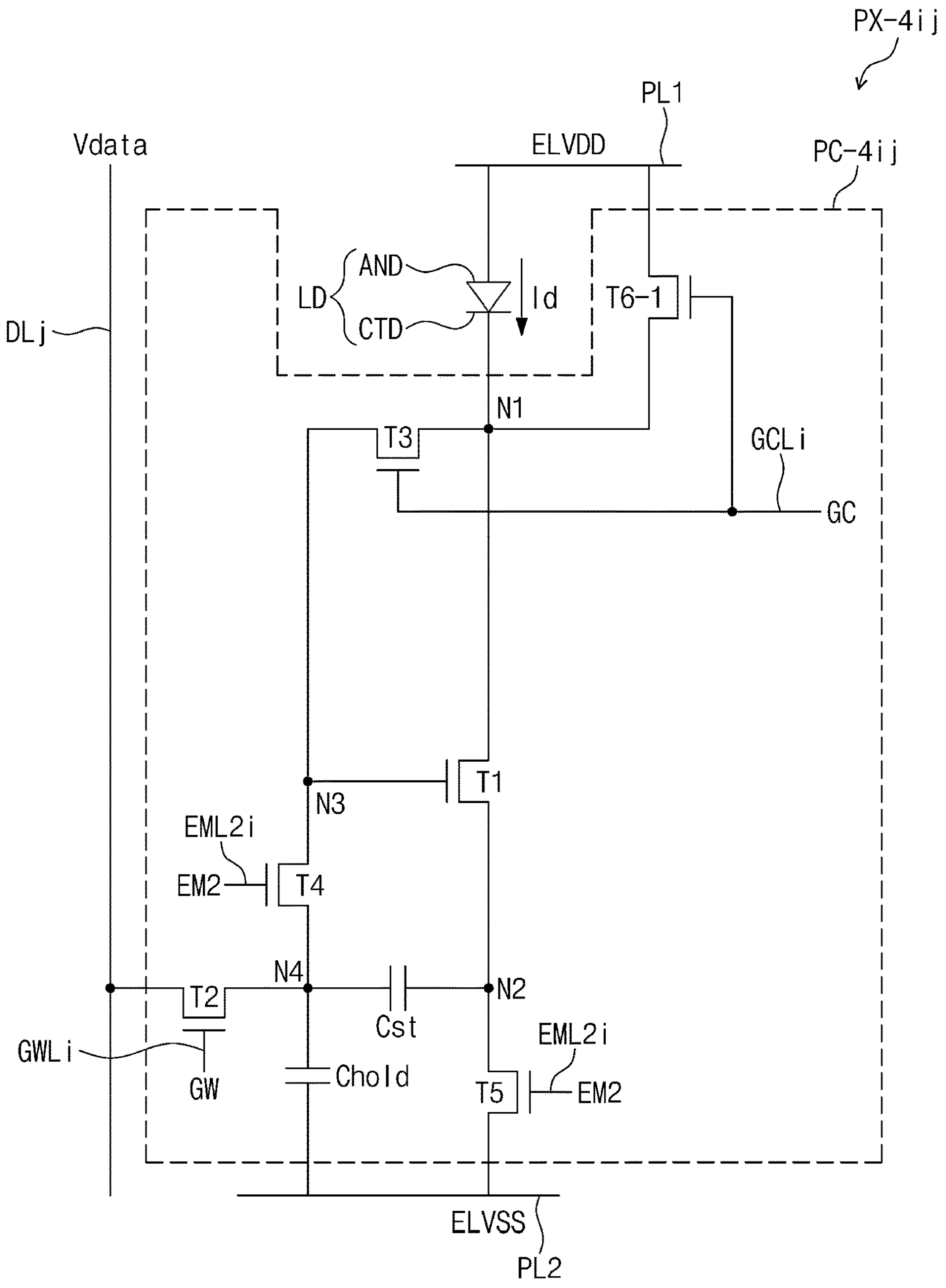
FIG. 13 is a schematic diagram of an equivalent circuit of a pixel according to an embodiment.

FIG. 13 is a schematic diagram of an equivalent circuit of a pixel according to an embodiment. In the following description made with reference to FIG. 13, the same reference numerals are assigned to the same components described with reference to FIG. 10, and the details thereof will be omitted for descriptive convenience.

Referring to FIGS. 11 and 13, a pixel PX-4*ij* may include the light emitting element LD and a pixel driving circuit PC-4*ij*.

The pixel driving circuit PC-4*ij* may include the first to sixth transistors T1, T2, T3, T4, T5, and T6-1 and capacitors Cst and Chold.

The capacitors Cst and Chold may include the first capacitor Cst and the second capacitor Chold.

The second capacitor Chold may be connected between the fourth node N4 and the second power line PL2.

The first electrode of the first transistor T1 may be connected (e.g., directly connected) to the first node N1.

The pixel PX-4*ij* according to an embodiment may be referred to as having a 6T-2C structure.

One electrode of the second capacitor Chold may be connected to the second power line PL2 supplied with the second supply voltage ELVSS, and an opposite electrode of the second capacitor Chold may be connected to the fourth node N4. The second capacitor Chold may store charges corresponding to a voltage difference between the second supply voltage ELVSS and the fourth node N4. The second capacitor Chold may be referred to as a hold capacitor. The second capacitor Chold may have a higher capacitance than the first capacitor Cst. For example, the second capacitor Chold may have a higher storage capacity than the first capacitor Cst.

The pixel driving circuit PC-4*ij* according to an embodiment may have a structure further including the second capacitor Chold in addition to the pixel driving circuit PC-2*ij* (see FIG. 10).

According to an embodiment, the second capacitor Chold may minimize the voltage change at the fourth node N4 in response to the voltage change of the second node N2. The reliability of a voltage provided (or applied) to a gate electrode of the third node N3 and the first transistor T1 may be improved. Accordingly, the pixel PX-4*ij* having improved display quality and the display device DD (see FIG. 1) including the same may be provided.

Figure 14:
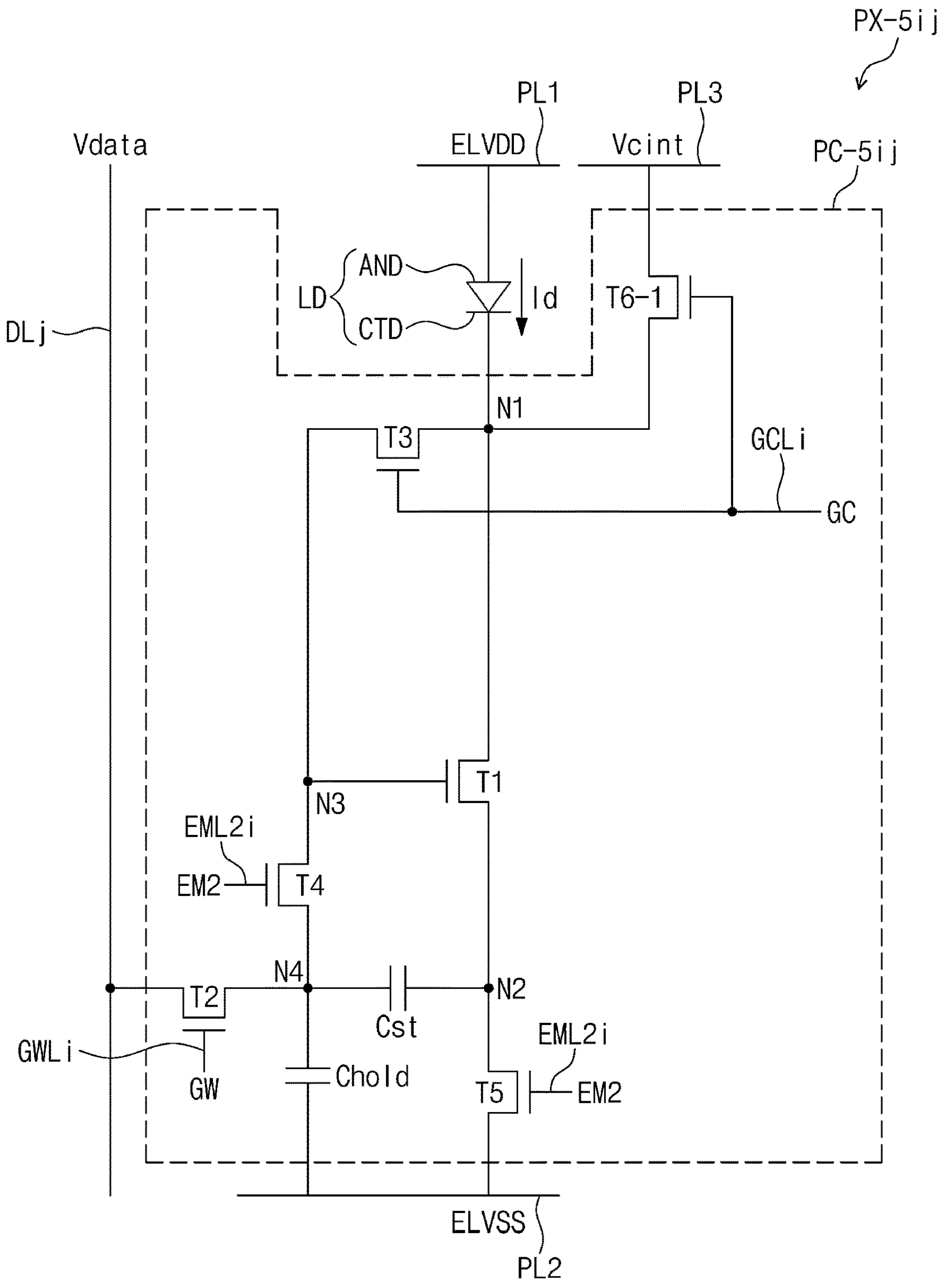
FIG. 14 is a schematic diagram of an equivalent circuit of a pixel according to an embodiment.

FIG. 14 is a schematic diagram of an equivalent circuit of a pixel according to an embodiment. In the following description made with FIG. 14, the same reference numerals are assigned to the same components described with reference to FIGS. 12 and 13, and the details thereof will be omitted.

Referring to FIGS. 11 and 14, a pixel PX-5*ij* may include the light emitting element LD and a pixel driving circuit PC-5*ij*.

The pixel driving circuit PC-5*ij* may include the first to sixth transistors T1, T2, T3, T4, T5, and T6 and the capacitors Cst and Chold.

The capacitors Cst and Chold may include the first capacitor Cst and the second capacitor Chold.

The second capacitor Chold may be connected between the fourth node N4 and the second power line PL2.

The first electrode of the first transistor T1 may be connected (e.g., directly connected) to the first node N1.

The pixel PX-5*ij* according to an embodiment may be referred to as having a 6T-2C structure.

The pixel driving circuit PC-5*ij* according to an embodiment may have a structure further including the second capacitor Chold in addition to the pixel driving circuit PC-3*ij* (see FIG. 11).

As described above, the threshold voltage of the first transistor may not affect the driving current flowing through a light emitting element. The driving current may be proportional to the square of the difference between the data signal and the initialization voltage, regardless of the characteristic of the first transistor. Accordingly, the brightness of the image output from the display panel may be maintained to be uniform. Accordingly, the pixel having the improved display quality and the display device including the same may be provided.

For example, as described above, the first supply voltage and the second supply voltage may not affect the driving current flowing through the light emitting element. The driving current may be proportional to the square of the difference between the data signal and the initialization voltage regardless of the voltage value of the first supply voltage and the voltage value of the second supply voltage. Accordingly, the brightness of the image output from the display panel may be maintained to be uniform. Accordingly, the pixel having the improved display quality and the display device including the same may be provided.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A pixel comprising:
a light emitting element connected between a first node and a first power line to provide a first supply voltage;
a first transistor including:
a first electrode electrically connected to the first node,
a second electrode electrically connected to a second node, and
a gate electrode electrically connected to a third node;
a second transistor including:
a first electrode electrically connected to a data line to provide a data signal,
a second electrode electrically connected to a fourth node, and
a gate electrode to receive a scan signal;
a third transistor including:
a first electrode connected to the first node,
a second electrode connected to the third node, and
a gate electrode to receive a compensation signal;
a fourth transistor including:
a first electrode electrically connected to the third node,
a second electrode electrically connected to the fourth node, and
a gate electrode to receive a first light emitting signal; and
a first capacitor connected between the second node and the fourth node, wherein the compensation scan signal and the first light emitting signal have an active level during a first period and the first is provided to the third node during the first period.

2. The pixel of claim 1, further comprising:
a fifth transistor including:
a first electrode connected to the second node,
a second electrode electrically connected to a second power line to provide a second supply voltage having a voltage level lower than a voltage level of the first supply voltage, and
a gate electrode to receive the first light emitting signal.

3. The pixel of claim 2, further comprising:
a sixth transistor including:
a first electrode electrically connected to the first node,
a second electrode electrically connected to an initialization voltage line to provide an initialization voltage, and
a gate electrode to receive a compensation scan signal.

4. The pixel of claim 3, further comprising:
a seventh transistor including:
a first electrode connected to the first node,
a second electrode connected to the first electrode of the first transistor, and
a gate electrode to receive a second light emitting signal.

5. The pixel of claim 4, wherein the compensation scan signal and the second light emitting signal have an active level during a second period subsequent to the first period.

6. The pixel of claim 5, wherein a voltage value, which is obtained by subtracting a threshold voltage of the first transistor from the first supply voltage, is provided to the second node during the second period.

7. The pixel of claim 5, wherein the scan signal has the active level during a third period subsequent to the second period.

8. The pixel of claim 7, wherein the data signal is provided to the fourth node during the third period.

9. The pixel of claim 7, wherein the first light emitting signal and the second light emitting signal have the active level during a fourth period subsequent to the third period.

10. The pixel of claim 2, further comprising:
a (6-1)-th transistor including:
a first electrode electrically connected to the first node,
a second electrode electrically connected to the first power line, and
a gate electrode to receive a compensation scan signal.

11. The pixel of claim 2, further comprising:
a second capacitor connected between the fourth node and the second power line.

12. An electronic device comprising:
a display device comprising:
a display panel including a plurality of pixels,
wherein each of the plurality of pixels includes:
a light emitting element connected between a first node and a first power line to provide a first supply voltage;
a first transistor including:
a first electrode electrically connected to the first node,
a second electrode electrically connected to a second node, and
a gate electrode electrically connected to a third node; and
a second transistor including:
a first electrode electrically connected to a data line to provide a data signal,
a second electrode electrically connected to a fourth node, and
a gate electrode to receive a scan signal;
a third transistor including:
a first electrode connected to the first node,
a second electrode connected to the third node, and a gate electrode to receive a compensation scan signal;

a fourth transistor including:

a first electrode connected to the third node, a second electrode connected to the fourth node, and a gate electrode to receive a first light emitting signal; and a first capacitor connected between the second node and the fourth node, wherein the compensation scan signal and the light emitting signal have an active level during a first period and the first supply voltage is provided to the third node during the first period.

13. The electronic device of claim 12, wherein each of the plurality of pixels further includes:

a fifth transistor including:

a first electrode connected to the second node, a second electrode electrically connected to a second power line to provide a second supply voltage having a voltage level lower than a voltage level of the first supply voltage, and a gate electrode to receive the first light emitting signal.

14. The electronic device of claim 13, wherein each of the plurality of pixels includes:

a sixth transistor including:

a first electrode electrically connected to the first node, a second electrode electrically connected to an initialization voltage line to provide an initialization voltage, and a gate electrode to receive the compensation scan signal.

15. The electronic device of claim 14, wherein each of the plurality of pixels further includes:

a seventh transistor including:

a first electrode connected to the first node, a second electrode connected to the first electrode of the first transistor, and a gate electrode to receive a second light emitting signal.

16. The electronic device of claim 13, wherein each of the plurality of pixels includes:

a (6-1)-th transistor including:

a first electrode electrically connected to the first node, a second electrode electrically connected to the first power line, and a gate electrode to receive the compensation scan signal.

17. The electronic device of claim 13, wherein each of the plurality of pixels further includes:

a second capacitor connected between the fourth node and the second power line.

18. The electronic device of claim 17, wherein the compensation scan signal and the second light emitting signal have the active level during a second period subsequent to the first period.

19. The electronic device of claim 18, wherein the scan signal has the active level during a third period subsequent to the second period.

20. The electronic device of claim 19, wherein the first light emitting signal and the second light emitting signal have the active level during a fourth period subsequent to the third period.

21. A pixel comprising:

a light emitting element connected between a first node and a first power line to provide a first supply voltage;

a first transistor connected between the first node and a second node, the first transistor including a gate electrode electrically connected to a third node;

a second transistor connected between a fourth node and a data line to provide a data signal, the second transistor including a gate electrode to receive a scan signal;

a third transistor connected between the first node and the third node, the third transistor including a gate electrode to receive a compensation scan signal;

a fourth transistor connected between the third node and the fourth node, the fourth transistor including a gate electrode to receive a first light emitting signal;

a fifth transistor connected between the second node and a second power line to provide a second supply voltage having a voltage level lower than a voltage level of the first supply voltage, the fifth transistor including a gate electrode to receive the first light emitting signal; and a sixth transistor connected between the first node and an initialization voltage line to provide an initialization voltage, the sixth transistor including a gate electrode to receive the compensation scan signal, wherein the compensation scan signal and the first light emitting signal have an active level during a first period and the first supply voltage is provided to the third node during the first period.

22. The pixel of claim 21, further comprising:

a first capacitor connected between the second node and the fourth node.

23. The pixel of claim 22, further comprising:

a seventh transistor connected between the first node and the first transistor, the seventh transistor including a gate electrode to receive a second light emitting signal.

24. The pixel of claim 23, further comprising:

a second capacitor connected between the fourth node and the second power line.

* * * * *